United States Patent
Schwaller et al.

(10) Patent No.: US 6,901,442 B1
(45) Date of Patent: May 31, 2005

(54) METHODS, SYSTEM AND COMPUTER PROGRAM PRODUCTS FOR DYNAMIC FILTERING OF NETWORK PERFORMANCE TEST RESULTS

(75) Inventors: Peter James Schwaller, Raleigh, NC (US); Joan Marie Bellinghausen, Cary, NC (US); Dana Scott Borger, Cary, NC (US); John C. Christensen, Raleigh, NC (US); Steven Thomas Joyce, Raleigh, NC (US); Roger Allen Lingle, Raleigh, NC (US); David V. H. Quan, Cary, NC (US); Scott Alan Southard, Raleigh, NC (US)

(73) Assignee: NetIQ Corporation, San Jose, CA (US)

( * ) Notice: Subject to any disclaimer, the term of this patent is extended or adjusted under 35 U.S.C. 154(b) by 0 days.

(21) Appl. No.: 09/479,568

(22) Filed: Jan. 7, 2000

(51) Int. Cl.$^7$ ............................................. G06F 15/173
(52) U.S. Cl. ..................................... 709/224; 709/223
(58) Field of Search ................................ 709/223, 224, 709/226, 238

(56) References Cited

U.S. PATENT DOCUMENTS

| | | |
|---|---|---|
| 4,545,011 A | 10/1985 | Lyon et al. |
| 5,049,873 A | 9/1991 | Robins et al. |
| 5,107,450 A | 4/1992 | Lawrenz |
| 5,257,393 A | 10/1993 | Miller |
| 5,459,837 A * | 10/1995 | Caccavale .................. 709/226 |
| 5,572,640 A | 11/1996 | Schettler |
| 5,634,009 A | 5/1997 | Iddon et al. |
| 5,706,436 A | 1/1998 | Lewis et al. |
| 5,732,213 A | 3/1998 | Gessel et al. |
| 5,734,697 A * | 3/1998 | Jabbarnezhad ........... 379/14.01 |
| 5,764,915 A | 6/1998 | Heimsoth et al. |
| 5,809,286 A | 9/1998 | McLain, Jr. et al. |
| 5,838,919 A | 11/1998 | Schwaller et al. |
| 5,881,237 A | 3/1999 | Schwaller et al. |

(Continued)

OTHER PUBLICATIONS

Brochure, Hot off the Shelf: Application Management, Data Communications (Jan. 1996).

(Continued)

Primary Examiner—Rupal Dharia
Assistant Examiner—Quang Nguyen
(74) Attorney, Agent, or Firm—Myers Bigel Sibley & Sajovec

(57) ABSTRACT

Dynamic filtering methods, systems and computer program products are provided for network performance test results which may apply network troubleshooting expertise and knowledge of network topology to select and display test results in a manner which may facilitate analysis of those results by IT staffs. In a further aspect of the present invention, a severity index is provided which may be generated based on exception events from a plurality of network performance measurements, for example, response time, throughput and availability, which measurements are generated from test results obtained from agents located on various devices on a computer network. The test results may be obtained from either passive application monitor agents or active network test agents. In another aspect of the present invention, the exception events may be detected based on automatically generated threshold criteria which may be provided user selectable sensitivity and may be based on a specified percentage criteria relative to baseline performance results. In a further aspect of the present invention, the test results may be stored using data buckets with the number of data buckets and/or the range of each of the data buckets being selected to provide a desired overall range and granularity for each of the plurality of network performance measurement types. The range (width) of some of the data buckets may be narrower than others to provide greater resolution in a region of interest.

34 Claims, 26 Drawing Sheets

U.S. PATENT DOCUMENTS

| | | | |
|---|---|---|---|
| 5,937,165 A | | 8/1999 | Schwaller et al. |
| 6,321,263 B1 | * | 11/2001 | Luzzi et al. ................. 709/224 |
| 6,370,572 B1 | * | 4/2002 | Lindskog et al. ........... 709/223 |
| 6,377,972 B1 | * | 4/2002 | Guo et al. ................... 709/238 |
| 6,446,123 B1 | * | 9/2002 | Ballantine et al. .......... 709/223 |
| 6,584,501 B1 | * | 6/2003 | Cartsonis et al. ........... 709/224 |
| 6,587,878 B1 | * | 7/2003 | Merriam ...................... 709/224 |
| 6,697,969 B1 | * | 2/2004 | Merriam ...................... 709/224 |

OTHER PUBLICATIONS

Brochure, "10 Reasons Why You Need an Applications View of Your Network," Compuware Corporation (Jan. 9, 1996).
Brochure, "Network General Corporation: Products and Services", Network General Corporation (1995).
Brochure, "ProView: Network Performance Management Systems", Network Telemetrics, Inc. (1995).
Brochure, "Managing the User Environment across Integrated SNA and IP Networks", Network Telemetrics, Inc. (1995).
Brochure, "Using Performance Baselines to Manage Network Service Levels", Williamson, W., Network Telemetrics, Inc. (1995).
Brochure, "Standard Based Distributed Diagnostics for Enterprise Networks", Frontier Software Development, Inc. (Sep. 1995).
Brochure, "Quality Works—The most complete client/server testing solution you can buy", Segue Software Products (1996).
Brochure, "LANQuest: Net/WRx", LANQuest (Sep. 12, 1995).
Brochure, "NETBENCH(R) 3.01 Frequently Asked Questions", Ziff–Davis Benchmark Operation .
Brochure, EcoNET: The View from the Top, Hurwitz Consulting Group, Inc. (1995).
Brochure, "Visual OnRamp™ Managed Internet Access Device" (Jan. 1996).
Brochure, "FirstSense".
Brochure, "NextPoint".
Brochure, "NextPoint Frame Relay™".
Brochure, "VeriServ™," Response Networks, Inc.
Brochure, "Service Management Architecture Product Overview," Jyra Research, Inc.
Brochure, "Optimal Application Expert™" Optical Networks Corp. (1997).
Article, Sobel, Ken; "*Compuware—s EcoSCOPE*"; *Hurwitz Group, Inc.* (Sep. 1997).
*Characterizing End–to–End Performance: A VitalSigns Whitepaper*, VitalSigns Software, Inc. 1998.
*Compuware EcoSystems Expands Application Performance Analysis Capabilities for Large Enterprises, Computware News Release*, Oct. 20, 1998.
Website Product Description of Patrol from BMC Software (Dec. 1998).
Brochure, "First Sense Agent" 1998.
VitalAgent from INS Brochure, May 1998.
Brochure, "Luminate TimePiece".
Website Product Description of Luminate for SAP R/3 (Dec. 1998).
Website Product Description of Envive for SAP R/3 (Dec. 1998).
Brochure, "NetScout" 1997.
Brochure, "Sniffer" 1998.
Brochure, "NetMetrix from Hewlett Packard" (1995).
Application Expert from Optimal Networks Corp. Brochure, 1999.
Brochure, "EcoSCOPE" from Compuware Corp., 1998.
Brochure, "EcoSCOPE" from Compuware Corp., Jan. 1999.
Visual Onramp from Visual Networks, Inc., Jan. 1996.
VeriServ from Response Networks, Inc. Brochure, Nov. 1997.
SLM from Jyra Research, Inc. Brochure, 1997.
VitalAnalysis from VitalSigns Software Brochure, Jan. 1998.
VitalAnalysis from VitalSigns Software, Inc. Brochure, Jun. 1996.
Butterfield, "System Performance Monitor/2 Reference," International Business Machines Corporation (1991).
Brochure, "The DA–30® family of internetwork analyzers", Wandel & Goltermann (1994).
Brochure, "DA–30C benchmarking Capabilities", Wandel & Goltermann (1995).
Brochure, "Vital Signs VisionNet", BlueLine Software, Inc., including inserts "LAN Agent", "VTAM Agent", "NCPL Agent" (1995).
Brochure, Vital Signs VisionNet (1995).
Brochure, "SmartBits: Switch testing in its simplest form . . . ", Netcom Systems, Inc. (1995).
Brochure, "EconNET™: Networked Applications Performance Management", Compuware Corporation (1995).

\* cited by examiner

Monitor Console Output Frame

| View By<br>Client Endpoint Name | ▲ Severity<br>Friday | ▽ Hourly Breakdown | Trend<br>11/14/1999-11/20/1999 |
|---|---|---|---|
| Sales2_NY | ☐ | ▭▭▭▭▭ | ☐ |
| Sales1_NY | ☐ | ▭▭▭▭▭ | ☐ |
| | | | |
| | | | |
| | | | |
| | | | |
| | | | |
| | | | |

Current Filter: (All) / Application = Lotus Notes / Client Endpoint Location = New York    Apply Filter [Choose a Filter]▼

◎ Application
⊕ Network    9D
⊟ System

Monitor View Type
[Status Overview ▼]
View By
[Application ▼]
Time Span (Trend / Severity)
[Weekly / Daily ▼]
Trend Range
[11/14/1999-11/20/1999 ▼]
Severity Range
[Friday ▼]
[Refresh View]

Additional Pages: [<<First] [<Prev] Page 1 of 2 [Next>] [Last>>]
Associated Summary Reports:  Performance Summary  Exception Summary  Outlook Summary
Severity Performance: ☐ = good  ☐ = bad    Trend Performance: ▼ = improving  △ = deteriorating Page generated on:
12/22/99 04:41:32 PM

FIG. 9C

Monitor Console Output Frame

Current Filter: (All) / Application = Lotus Notes / Client Endpoint Location = New York / Client Endpoint Name = Sales2_NY Apply Filter [Choose a Filter] ▼

| View By<br>Server Endpoint Location | △ Severity<br>Friday | ▽ Hourly Breakdown | Trend<br>11/14/1999-11/20/1999 |
|---|---|---|---|
| Dallas | □ | ▭ | □ |
| | | | |
| | | | |
| | | | |
| | | | |
| | | | |

○ Application
⊕ Network
▭ System  9E

Monitor View Type
[Status Overview ▼]
View By
[Application ▼]
Time Span (Trend / Severity)
[Weekly / Daily ▼]
Trend Range
[11/14/1999-11/20/1999 ▼]
Severity Range
[Friday ▼]

[Refresh View]

Additional Pages: (none)
Associated Summary Reports:  Performance Summary  Exception Summary  Outlook Summary
Severity Performance: □ = good  □ = bad     Trend Performance: ▼ = improving  △ = deteriorating Page generated on:
12/22/99 04:43:04 PM

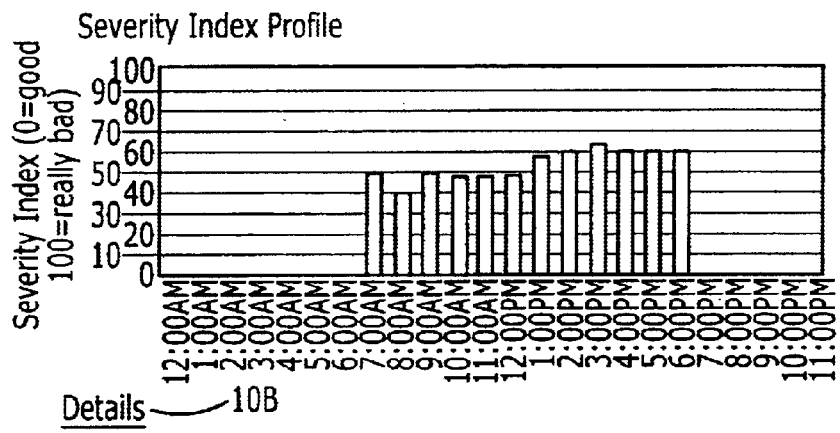
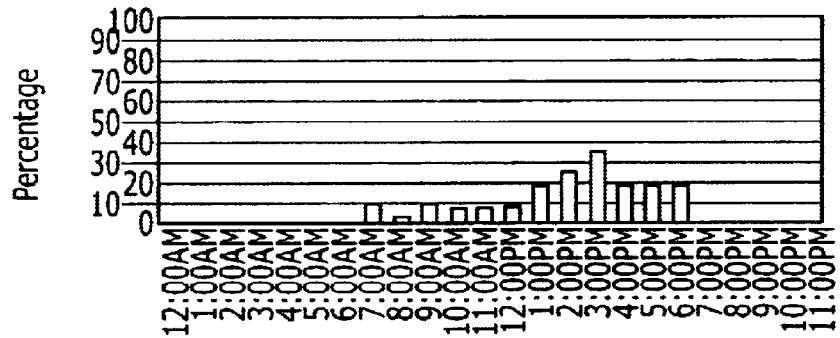
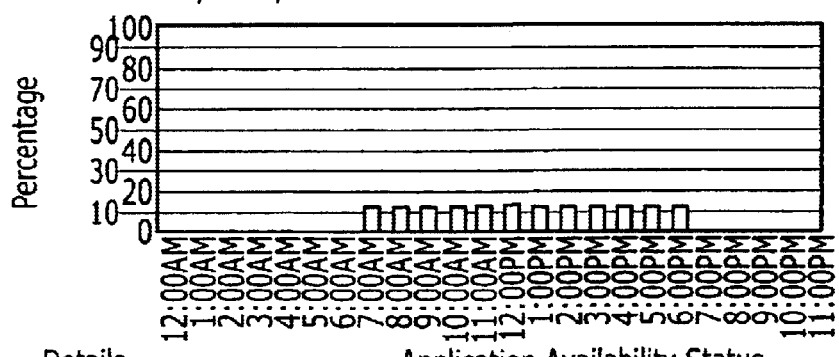
FIG. 10A

| Application Severity Index Status |
|---|
| Print Date/Time: 12/22/99 04:48:38 PM |
| Reporting Period: 11/19/99 12:00:00 AM - 11/19/99 11:59:59 PM |
| Filter: Application=Lotus Notes |
| Severity Index |

| Time | Severity Index | Response Time Exceptions | Throughput Exceptions | Availability Exceptions |
|---|---|---|---|---|
| 12:00:00AM | | | | |
| 1:00:00AM | | | | |
| 2:00:00AM | | | | |
| 3:00:00AM | | | | |
| 4:00:00AM | | | | |
| 5:00:00AM | | | | |
| 6:00:00AM | | | | |
| 7:00:00AM | 49.458 | 9.19% | 0.00% | 1.23% |
| 8:00:00AM | 39.856 | 1.71% | 0.00% | 1.23% |
| 9:00:00AM | 49.748 | 9.50% | 0.00% | 1.23% |
| 10:00:00AM | 47.080 | 6.85% | 0.00% | 1.23% |
| 11:00:00AM | 47.917 | 7.63% | 0.00% | 1.23% |
| 12:00:00PM | 48.239 | 7.94% | 0.00% | 1.23% |
| 1:00:00PM | 58.273 | 18.54% | 0.00% | 1.23% |
| 2:00:00PM | 59.782 | 25.23% | 0.00% | 1.23% |
| 3:00:00PM | 63.325 | 33.96% | 0.00% | 1.23% |
| 4:00:00PM | 59.197 | 18.54% | 0.00% | 1.23% |
| 5:00:00PM | 58.510 | 17.45% | 0.00% | 1.23% |
| 6:00:00PM | 59.122 | 18.54% | 0.00% | 1.23% |
| 7:00:00PM | | | | |
| 8:00:00PM | | | | |
| 9:00:00PM | | | | |
| 10:00:00PM | | | | |
| 11:00:00PM | | | | |

FIG. 10B

Application Response Time Distribution
Print Date/Time: 12/22/99 04:50:02PM
Reporting Period: 11/19/99 12:00:00AM - 11/19/99 11:59:59PM
Filter: Application = Lotus Notes
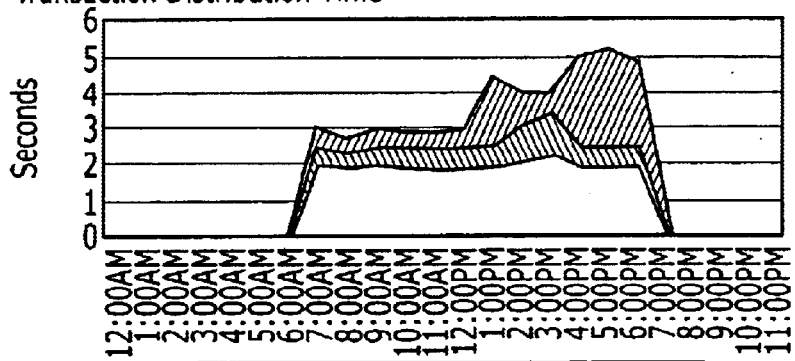
10E
Summary    Details — 10D
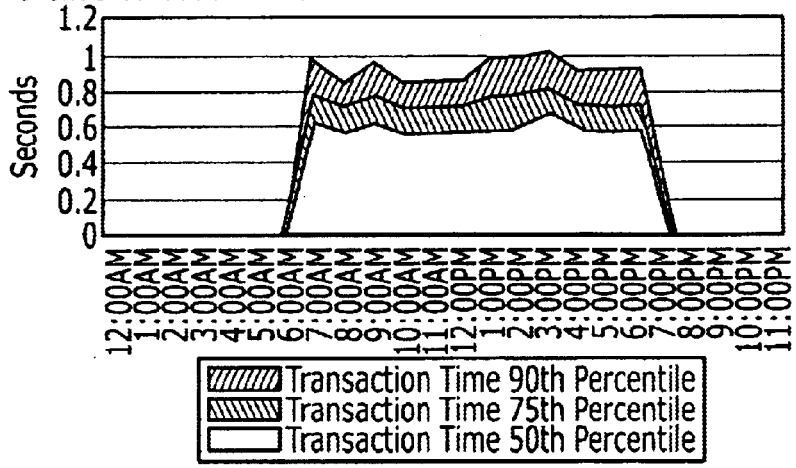
Summary    Details
System Status
TO FIG. 10C.2
FIG. 10C.1

FROM FIG. 10C.1
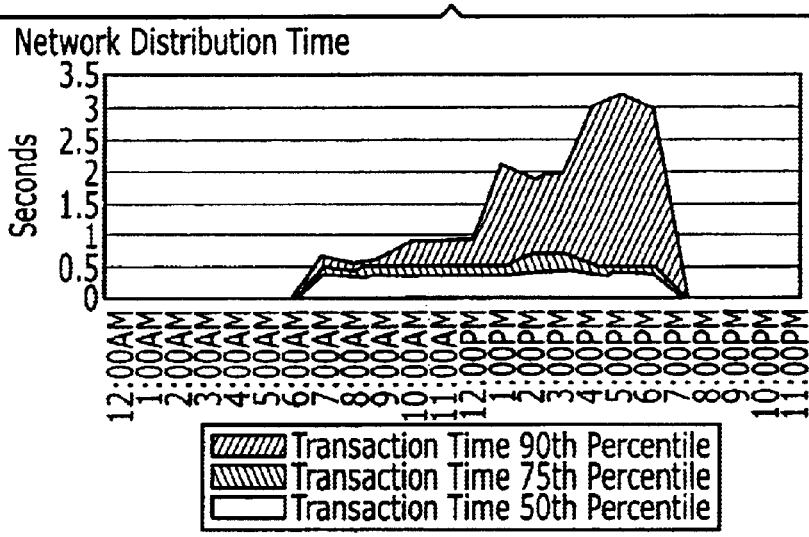
Summary | Details
Traceroute Analysis | Application Performance Status
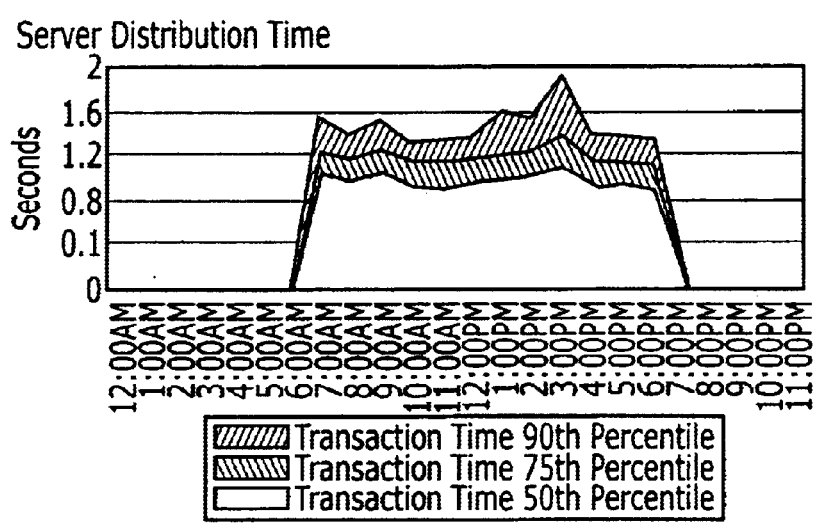
Summary | Details
System Status
FIG. 10C.2

| | | | | | | |
|---|---|---|---|---|---|---|
| Application Response Time Distribution<br>Print Date/Time: 12/22/99 04:58:35PM<br>Reporting Period: 11/19/99 12:00:00AM - 11/19/99 11:59:59PM<br>Filter: Application = Lotus Notes ||||||||
| Transaction Time Details ||||||||

| Time | Samples | Average (sec) | Standard Deviation | 90th Percentile | 75th Percentile | 50th Percentile |
|---|---|---|---|---|---|---|
| 12:00:00AM | | | | | | |
| 1:00:00AM | | | | | | |
| 2:00:00AM | | | | | | |
| 3:00:00AM | | | | | | |
| 4:00:00AM | | | | | | |
| 5:00:00AM | | | | | | |
| 6:00:00AM | | | | | | |
| 7:00:00AM | 642 | 2.056 | 0.675 | 2.972 | 2.469 | 1.954 |
| 8:00:00AM | 642 | 1.911 | 0.538 | 2.734 | 2.334 | 1.870 |
| 9:00:00AM | 642 | 2.059 | 0.673 | 2.983 | 2.473 | 1.938 |
| 10:00:00AM | 642 | 1.947 | 0.610 | 2.897 | 2.409 | 1.844 |
| 11:00:00AM | 642 | 1.946 | 0.624 | 2.919 | 2.414 | 1.838 |
| 12:00:00PM | 642 | 1.991 | 0.623 | 2.935 | 2.462 | 1.881 |
| 1:00:00PM | 642 | 2.313 | 1.316 | 4.400 | 2.484 | 1.879 |
| 2:00:00PM | 642 | 2.281 | 1.022 | 3.959 | 3.015 | 1.935 |
| 3:00:00PM | 642 | 2.500 | 0.984 | 3.944 | 3.353 | 2.127 |
| 4:00:00PM | 642 | 2.372 | 1.464 | 4.935 | 2.474 | 1.863 |
| 5:00:00PM | 642 | 2.385 | 1.474 | 5.149 | 2.472 | 1.838 |
| 6:00:00PM | 642 | 2.361 | 1.433 | 4.842 | 2.475 | 1.854 |
| 7:00:00PM | | | | | | |
| 8:00:00PM | | | | | | |
| 9:00:00PM | | | | | | |
| 10:00:00PM | | | | | | |
| 11:00:00PM | | | | | | |

FIG. 10D

| Application Response Time Distribution |
| --- |
| Print Date/Time: 12/22/99 04:58:06PM |
| Reporting Period: 11/19/99 12:00:00AM - 11/19/99 11:59:59PM |
| Filter: Application = Lotus Notes |

| Response Time Distribution Summary |
| --- |

Samples: 7,704
Average Turns: 1.000 turns/transaction

|  | Rate of Change (sec/week) | Average (sec) | Standard Deviation | 90th Percentile | 75th Percentile | 50th Percentile |
| --- | --- | --- | --- | --- | --- | --- |
| Transaction Time | 0.000 | 2.177 | 1.038 | 3.543 | 2.505 | 1.895 |
| Client Time | 0.000 | 0.591 | 0.229 | 0.909 | 0.735 | 0.579 |
| Network Time | 0.000 | 0.587 | 0.738 | 0.953 | 0.498 | 0.389 |
| Server Time | 0.000 | 0.999 | 0.349 | 1.462 | 1.190 | 0.963 |

FIG. 10E

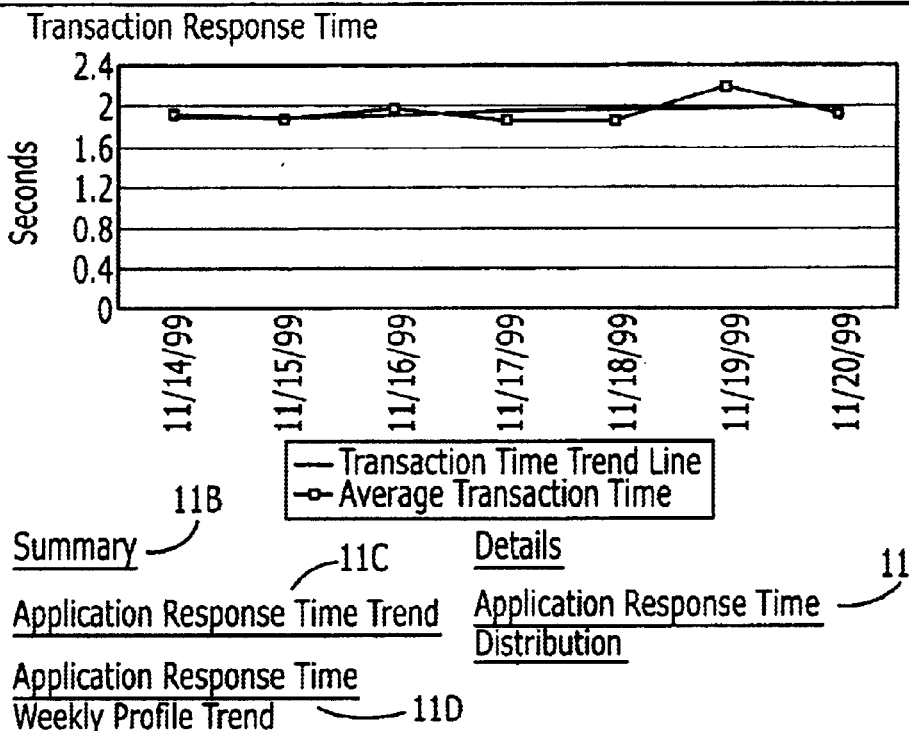
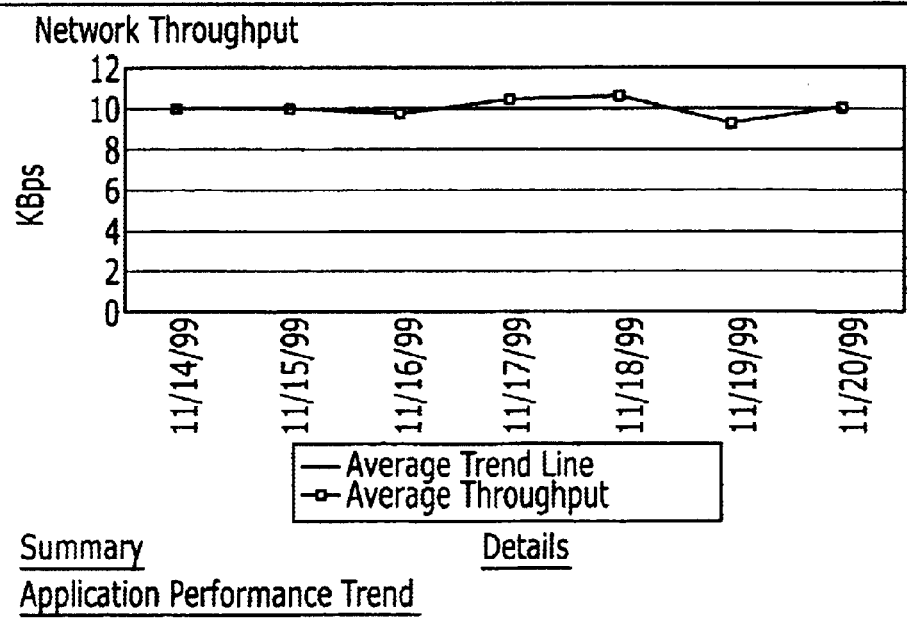
TO FIG. 11A.2
FIG. 11A.1

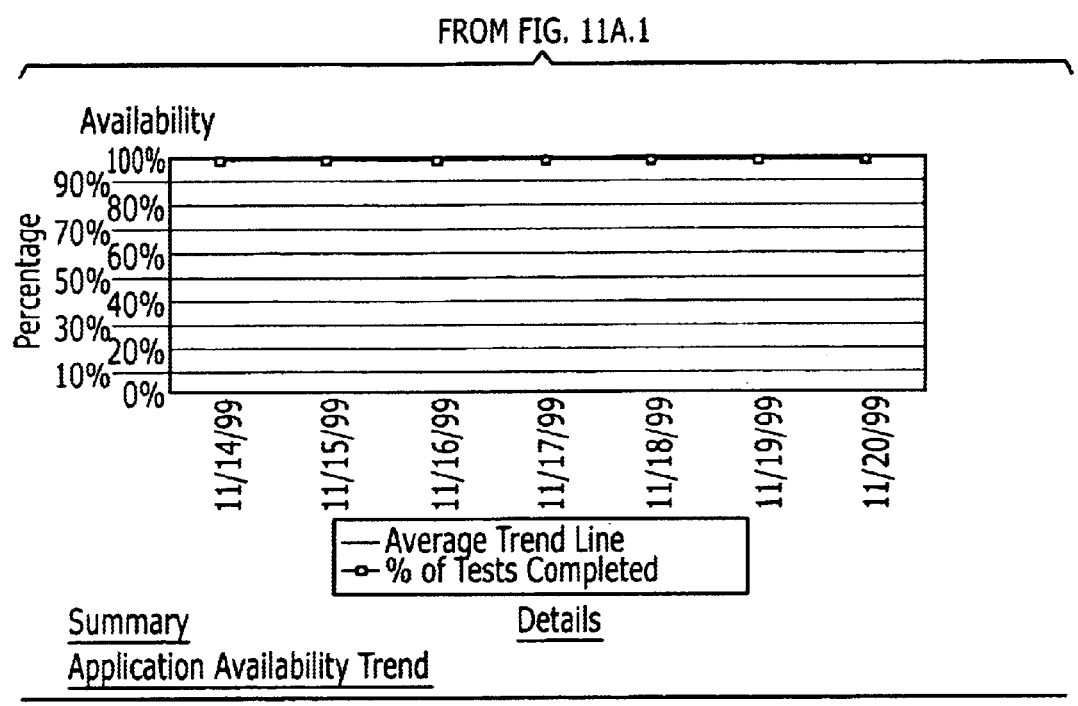
FIG. 11A.2

| Application Trend Index |
|---|
| Print Date/Time: 12/22/99 05:00:16PM |
| Reporting Period: 11/14/99 12:00:00AM - 11/20/99 11:59:59PM |
| Filter: Application = Lotus Notes |
| Performance Trend Summary |

| | |
|---|---|
| Rate of Change for Transaction Time: 0.116 seconds/week | Average Transaction Time: 1.929 sec |
| Rate of Change for Throughput: -0.233KBps/week | Average Throughput: 10.007 KBps |
| Rate of Change for Availability: 0.15 percent/week | Availability: 98.51% |

FIG. 11B

| Application Trend Index |
|---|
| Print Date/Time: 12/22/99 04:59:45 PM |
| Reporting Period: 11/14/99 12:00:00 AM - 11/20/99 11:59:59 PM |
| Filter: Application=Lotus Notes |
| Performance Trend |

| Date | Transaction Time (sec) | Throughput (KBps) | Availability |
|---|---|---|---|
| 11/14/99 | 1.911 | 10.048 | 98.46% |
| 11/15/99 | 1.874 | 9.990 | 98.46% |
| 11/16/99 | 1.957 | 9.766 | 98.46% |
| 11/17/99 | 1.845 | 10.466 | 98.46% |
| 11/18/99 | 1.833 | 10.604 | 98.46% |
| 11/19/99 | 2.177 | 9.179 | 98.77% |
| 11/20/99 | 1.905 | 9.998 | 98.46% |

FIG. 11C

Application Response Time Weeky Profile Trend
Print Date/Time: 12/22/99 05:01:05PM
Reporting Period: 11/14/99 12:00:00AM - 11/20/99 11:59:59PM
Filter: Application = Lotus Notes
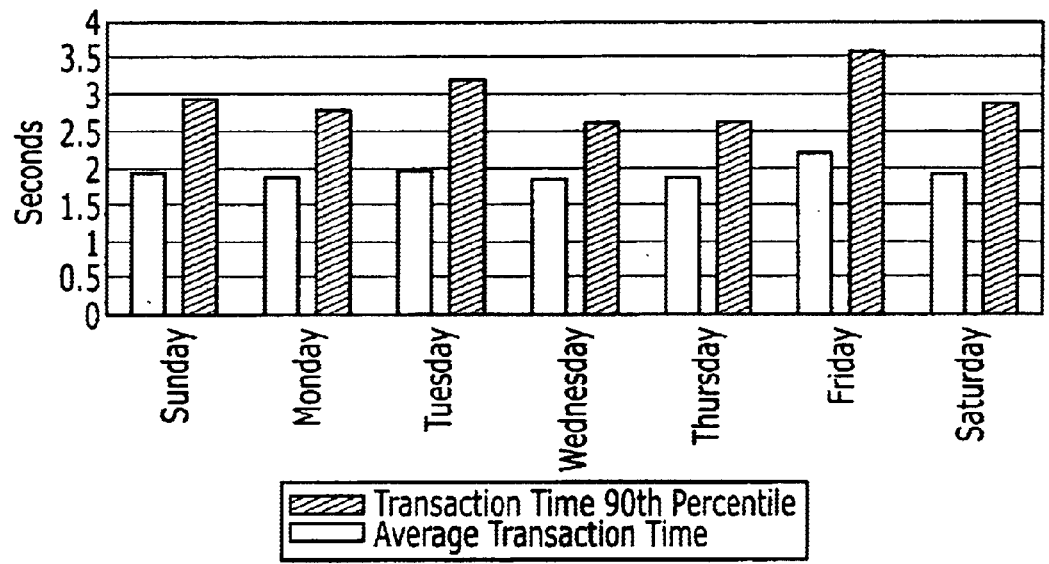
Details
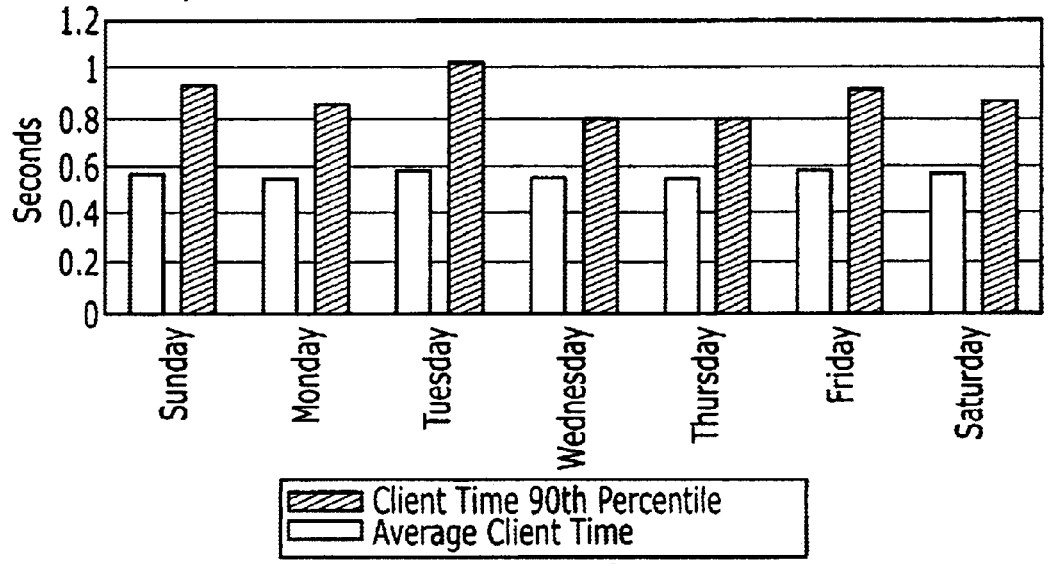
Details        System Status
TO FIG. 11D.2
FIG. 11D.1

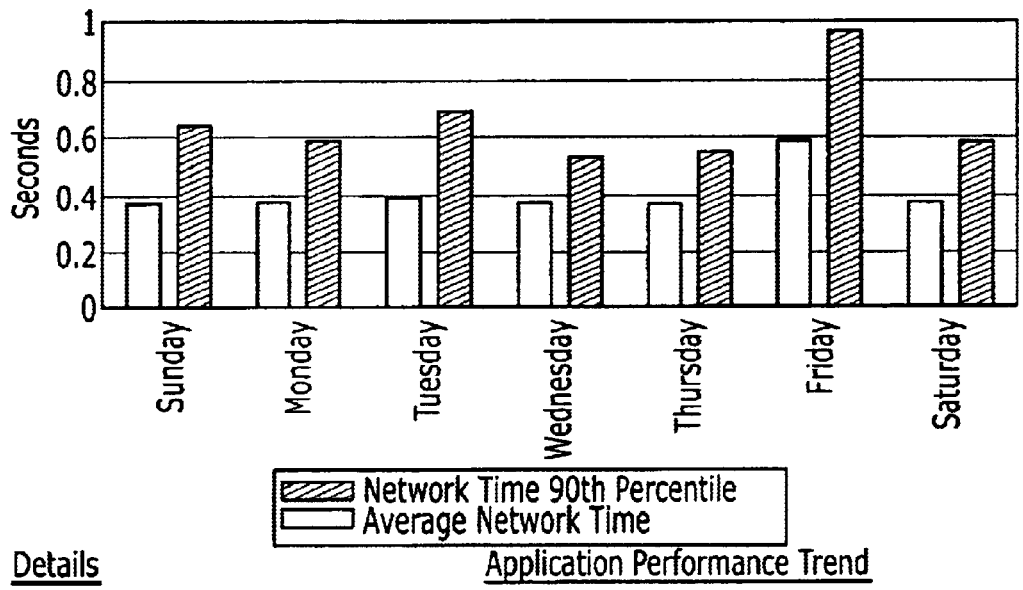
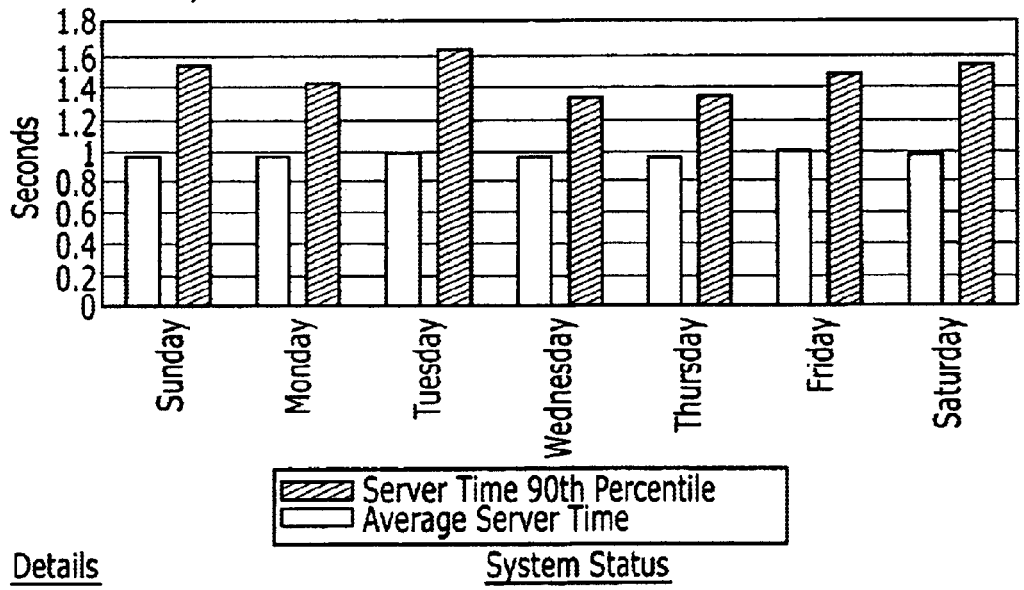
FIG. 11D.2

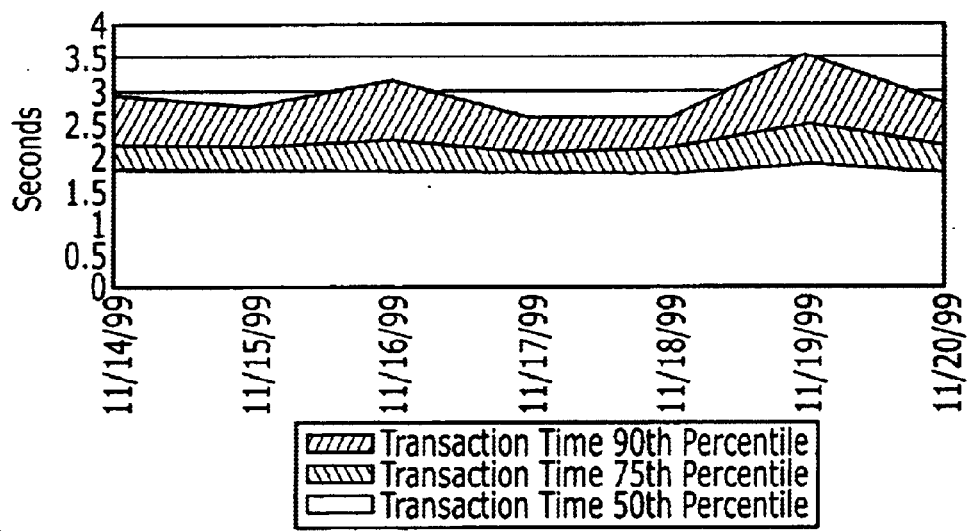
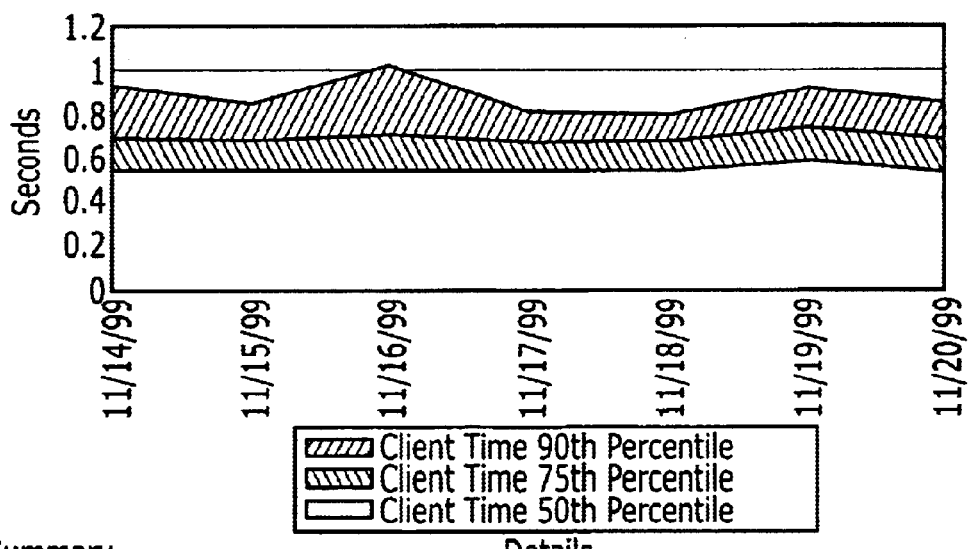
TO FIG. 11E.2
FIG. 11E.1

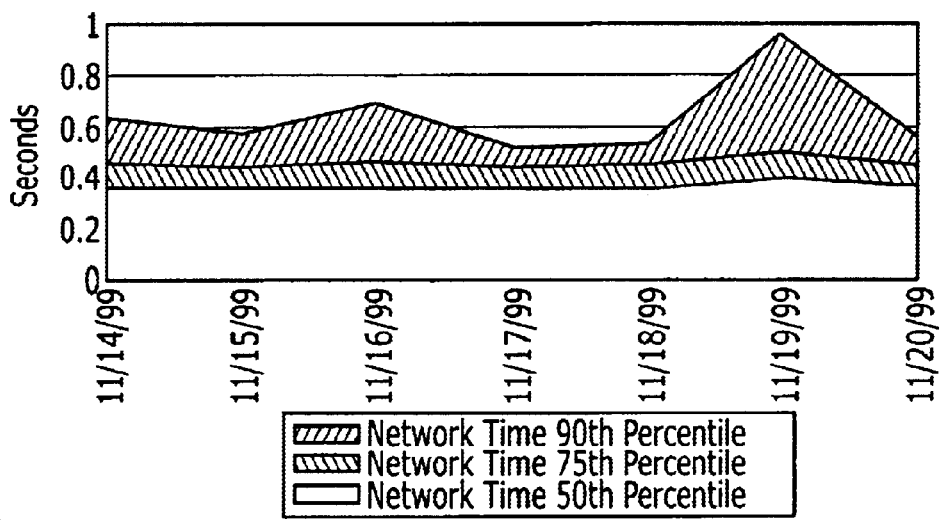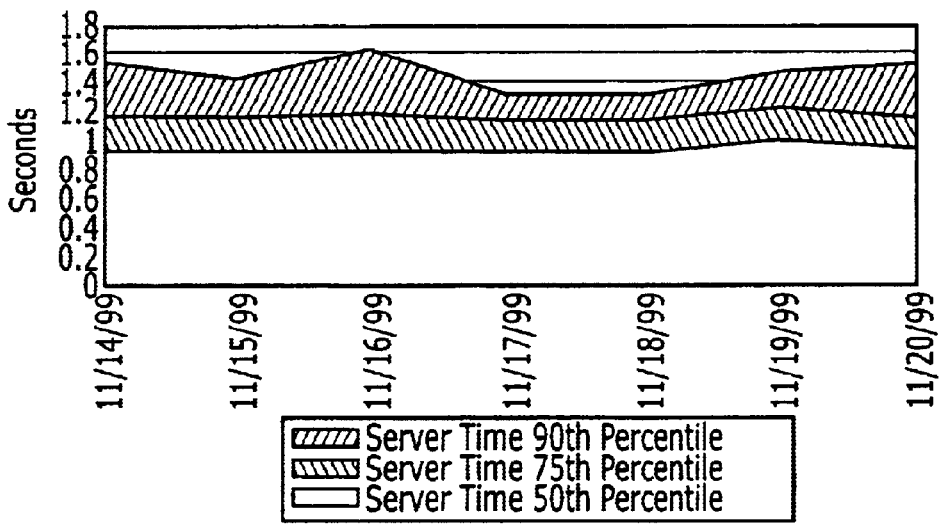
FIG. 11E.2

FIG. 13

METHODS, SYSTEM AND COMPUTER PROGRAM PRODUCTS FOR DYNAMIC FILTERING OF NETWORK PERFORMANCE TEST RESULTS

FIELD OF THE INVENTION

The present invention, generally, relates to data analysis, and, more particularly, to systems, methods and computer program products for analysis of data related to network communications.

BACKGROUND OF THE INVENTION

Companies are often dependent on mission-critical network applications to stay productive and competitive. To achieve this, information technology (IT) organizations preferably provide reliable application performance on a 24-hour, 7-day-a-week basis. In this demanding environment, frequent network expansion and day-to-day fire fighting often leave little time for IT managers to manage network performance proactively. Accordingly, IT managers typically rely on some form of system management and/or network management tools to help automate performance management tasks to increase the efficiency of the IT staffs. Even with these tools, IT staffs are typically required to commit resources to integrating and customizing the tools to work in the heterogeneous network environments which may include, for example, hardware from a variety of vendors, executing a variety of operating systems and communication protocols and supporting a variety of application programs for different end user requirements.

Various known system management products track specific information, such as the CPU utilization on a server, server paging and disk access activity, or client application response time. This information may be useful when solving problems on a network. These products can generally be categorized as passive systems or application monitors. This category typically is implemented as software agent technologies that reside on the client or server computers. They generally passively monitor live application transactions and monitor resource utilization. Products in this category include Patrol from BMC Software, Inc., FirstSense Agent from FirstSense Software, Inc., VitalAgent from INS, Luminate Software Corp., and Envive Corp. As they are passive application monitors, they typically support specific application programs. For example, Luminate Software and Envive support the SAP R/3 application. Their measurements are generally neither consistent nor repeatable, as a user's interaction with a given application varies over time. Moreover, they are typically not suited to detecting system slowdowns or failures from the perspective of an end user. Operations for one such passive monitor are described in "Characterizing End-to-End Performance: A VitalSigns Whitepaper," VitalSigns Software, Inc. 1998.

Another approach to passive monitoring is directed to the network rather than the overall system. On the network side, element managers or passive network monitors are known which may address a specific segment or device on the network. Element managers are generally software designed to manage specific groups of devices, such as routers and switches. Passive network monitors are typically a combination of hardware and software that may, for example, monitor network traffic at the link layer or at the infrastructure devices. Products falling in this category include remote monitor (RMON) probes from NetScout Systems, Inc., Sniffer from Network Associates, NetMetrix from Hewlett-Packard, Application Expert from Optimal Networks Corp., EcoSCOPE from Compuware Corp., and Visual OnRamp from Visual Networks, Inc. These network management tools typically provide information such as packet loss, bit rates, and network utilization. This type of information may be helpful in fixing a network problem after the problem has been identified. However, as with the passive system monitors, these tools generally do not reflect network performance as experienced by a user. These tools are passive, in that they generally watch the network traffic which traverses a network segment or link, rather than actively creating traffic.

Passive network monitors sometimes include a basic scheduler to collect sample data from their data sources. A basic scheduler generally merely specifies the frequency (e.g., once every 15 minutes) at which the management console of the monitor should collect data from the data sources. Passive monitors are limited in that they are typically expensive to scale, only see traffic that is on the network at the time.

Another category of system management tool is active application monitors. These are products that generally measure performance by actively emulating application transactions. These transactions are often referred to as "synthetic" transactions. Products in this category include Ganymede Software Inc.'s Chariot® and Pegasus™ products, as described in U.S. Pat. Nos. 5,838,919, 5,881, 237 and 5,937,165, VeriServ from Response Networks, Inc. and SLM from Jyra Research Inc. VeriServ allows an operator to define the types of applications to be monitored, times and days, and the end user locations from which the transactions are to originate. The operator may also choose to define alarm thresholds. Agents installed at the end user location monitor actual sample application transactions to measure performance of the applications operating over the network environment. VeriServ automatically tests applications at a fixed interval. SLM provides the flexibility for the user to schedule synthetic transactions for any interval from 5 minutes to a year. However, as these approaches are also typically directed to a particular application and require that the applications be installed and operating to generate network traffic, they generally only address simple web and database transactions. Also, any new or custom applications may require extensive configuration by the users to allow the tester to interact with the applications. In addition, active network testers add traffic to the communication network being tested, thereby using network resources which would otherwise be available for users.

As the range of information available to IT staffs from network performance tools increases, IT staffs face increasing challenges in attempting to analyze the large volumes of resulting data to identify and respond to problems promptly. The increasing complexity of networks and the variety of applications and users utilizing those networks in a client-server environment makes the challenge even greater for IT staffs. These problems are further exacerbated as networks are typically not static as new hardware and software application programs may be periodically added thereby changing the traffic characteristics on the network and the end user's experience of network performance. It is increasingly important to analyze the actual performance of the network to be tested without the constraints and limitations of these existing tools. It would also be beneficial to provide network performance tools that reduce the level of expertise about network performance and topology required of IT personnel.

One approach to improving the analysis of network performance data is that used with VitalAnalysis™ available from VitalSigns Software, Inc. This system provides a display to a user graphically representing various performance measurements, for example, response time, on a "heat" screen with problem conditions for each of the various performance measurements reflected by an associated color and further providing trend information for the various performance measurements. In addition, the results for each performance measurement may be broken down by application type to assist with identification of particular applications having problems. However, this approach still requires assessment by a user of a number of different performance measurements, each of which may have a variable impact as perceived by different users executing applications on the network being monitored. In addition, complex networks typically include a large number of client and server devices at dispersed geographic locations. Accordingly, it may still be problematic for an IT staff to isolate the cause for a performance problem even after it is detected.

SUMMARY OF THE INVENTION

The present invention provides dynamic filtering tools for network performance test results which may apply network troubleshooting expertise and knowledge of network topology to select and display test results in a manner which may facilitate analysis of those results by IT staffs. In a further aspect of the present invention, a severity index is provided which may be generated based on exception events from a plurality of network performance measurements, for example, response time and throughput, which measurements are generated from test results obtained from agents located on various devices on a computer network. The test results may be obtained from either passive application monitor agents or active network test agents. In another aspect of the present invention, the exception events may be detected based on automatically generated threshold criteria which may be provided with user selectable sensitivity and may be based on a specified percentage criteria relative to baseline performance results. In a further aspect of the present invention, the test results may be stored using data buckets with the number of data buckets and/or the range of each of the data buckets being selected to provide a desired overall range and granularity for each of the plurality of network performance measurement types. The range (width) of some of the data buckets may be narrower than others to provide greater resolution in a region of interest, such as the region associated with detection of the exception events.

In one embodiment of the present invention, dynamic filtering of network performance test results is provided. A performance index for each of one of a plurality of applications that executes on the network or a first plurality of devices coupled to the network and an identification of each of the one of a plurality of applications that execute on the network or a first plurality of devices coupled to the network is displayed. The network performance test results are filtered based on a first user selection of one of the identifications to provide network performance test results associated with the selected one of the one of a plurality of applications that execute on the network or a first plurality of devices coupled to the network as first filtered results. Performance indexes are obtained for the other of a plurality of applications that execute on the network or a first plurality of devices coupled to the network based on the first filtered results responsive to the first user selection. The obtained performance indexes for the other of a plurality of applications that execute on the network or a first plurality of devices coupled to the network are displayed responsive to the first user selection.

In another embodiment of the present invention, the plurality of applications may be application programs executing on the first plurality of devices in which event the network performance test results may be based on passive monitoring of the application programs executing on the first plurality of devices. In addition, the network performance test results may be associated with a client-server communications network and the first plurality of devices may be client devices on the communications network. Alternatively, the plurality of applications may be application scripts and the network performance test results may then be based on active network testing of a communications network by the first plurality of devices using the application scripts. In one embodiment, the network performance test results are based on endpoint pair based active network testing using an endpoint specific test protocol between a designated first endpoint and an associated second endpoint and the first plurality of devices are designated first endpoint devices.

In a further embodiment of the present invention, identifications may be displayed of the other of a plurality of applications or a first plurality of devices and the first filtered results may be filtered based on a second user selection of one of the identifications of the other of a plurality of applications or a first plurality of devices to provide second filtered results. Performance indexes may be obtained for a second plurality of devices based on the second filtered results responsive to the second user selection and the obtained performance indexes for the second plurality of devices may be displayed responsive to the second user selection. The first and the second plurality of devices may be client and/or server devices respectively and the devices may be locations including a plurality of individual computers or individual computers.

In a further aspect of the present invention, the performance indexes may be severity indexes generated for each of the other of a plurality of applications or a first plurality of devices characterizing network performance test results based on a number of exception events for each of a plurality of types of network performance tests. The generated severity indexes may be displayed. The plurality of types of network performance tests may include at least one of throughput, response time, application availability and transaction rate. Exception events may be identified for each of the plurality of types of network performance tests using threshold criteria for each of the plurality of types of network performance tests which are based on a specified percentage of baseline results for the respective types of network performance tests. The specified percentages may be obtained from a user to provide threshold criteria having a user selected sensitivity.

In another aspect of the present invention, exception events may be identified as follows. A number of data buckets may be designated for the respective type of network performance test and an associated range for each of the data buckets, at least one of the number of data buckets or the associated range for each of the data buckets being selected based on a desired range for the specified percentages, the data buckets comprising the baseline results. A network performance test data record may be generated based on a transaction and a one of the designated data buckets having an associated range including the generated network performance test data record may be incremented to record the network performance test data record. Ones of the data buckets satisfying the specified percentage for the respective type of network performance test may be determined based on numbers of records recorded in the data buckets. An exception event may be identified if the generated network performance test data record corresponds to a data bucket not satisfying the specified percentage.

In another embodiment of the present invention, a trend associated with the performance index for each of one of a plurality of applications or a first plurality of devices is displayed. Trends associated with each of the obtained performance indexes for the other of a plurality of applications or a first plurality of devices are obtained responsive to the first user selection and the obtained trends associated with each of the obtained performance indexes are displayed responsive to the first user selection. The trends and performance indexes are preferably displayed concurrently.

In a further aspect of the present invention, a network performance problem is identified based on network performance test results. Dynamic filtering is iteratively utilized responsive to respective selections of a worst one of a plurality of generated performance indexes and information is obtained related to a number of exception events for each of a plurality of types of network performance tests, the exception events being associated with the selected one of the performance indexes. Information may also be obtained related to a worst one of the number of exception events responsive to a selection of one of the plurality of types of network performance tests associated with a worst one of the number of exception events.

In yet another aspect of the present invention, network performance measurements are recorded for a communications network. A number of data buckets is generated for the network performance measurements and an associated range for each of the data buckets, at least one of the number of data buckets or the associated range for each of the data buckets being selected based on a user interest criterion. One of the network performance measurements is obtained based on a communication transaction over the communications network and a one of the designated data buckets having an associated range including the obtained one of the network performance measurements is incremented to record the generated one of the network performance measurements.

In a further aspect of the present invention, performance of a communications network is characterized. A severity index is generated associated with at least one of an application executing on the network or a device connected to the network based on a number of exception events for each of a plurality of types of network performance tests. The plurality of types of network performance tests may include at least one of throughput, response time, application availability and transaction rate. Each of the plurality of types of network performance tests may be provided a selected weighting in the severity index. Each of the exception events may be provided a pre-scaling based on a degree of deviation of the exception event wherein an exception based on a larger degree of deviation is provided a greater magnitude of severity points. The severity index may be based on a logarithmic function of a ratio of the severity points to a total transaction count over which the severity points were obtained.

In a further aspect of the present invention, a threshold criterion for a network performance measurement to detect a network performance exception event may be automatically established. The threshold criterion is automatically established based on a specified percentage of baseline results for the network performance measurement.

In yet another aspect of the present invention, a system for dynamically filtering network performance test results is provided. A display displays a performance index for each of one of a plurality of applications or a first plurality of devices and an identification of each of the one of a plurality of applications or a first plurality of devices. A filter module filters the network performance test results based on a first user selection of one of the identifications to provide network performance test results associated with the selected one of the one of a plurality of applications or a first plurality of devices as first filtered results. A performance index generation module obtains performance indexes for the other of a plurality of applications or a first plurality of devices based on the first filtered results responsive to the first user selection. The display is configured to display the obtained performance indexes for the other of a plurality of applications or a first plurality of devices responsive to the first user selection.

As will further be appreciated by those of skill in the art, while described above primarily with reference to method aspects, the present invention may also be embodied as systems and/or computer program products.

BRIEF DESCRIPTION OF THE DRAWINGS

FIGS. 9A–9E, 10A–10E, 11A–11E, 12 and 13 illustrate output displays for an embodiment of dynamic filtering according to the present invention.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the terms "coupled" and "connected" are intended to include both directly coupled/connected and indirectly coupled/connected.

As will be appreciated by one of skill in the art, the present invention may be embodied as methods, data processing systems (apparatus) and/or computer program products. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including semiconductor devices, hard disks, CD-ROMs, optical storage devices, or magnetic storage devices.

It is also to be understood that the present invention may be provided by combinations of steps for performing the specified functions and program instruction means for performing the specified functions. It will also be understood that these functions can be implemented by special purpose hardware-based computer systems which perform the specified functions or steps, or combinations of special purpose hardware and computer instructions.

Figure 1:
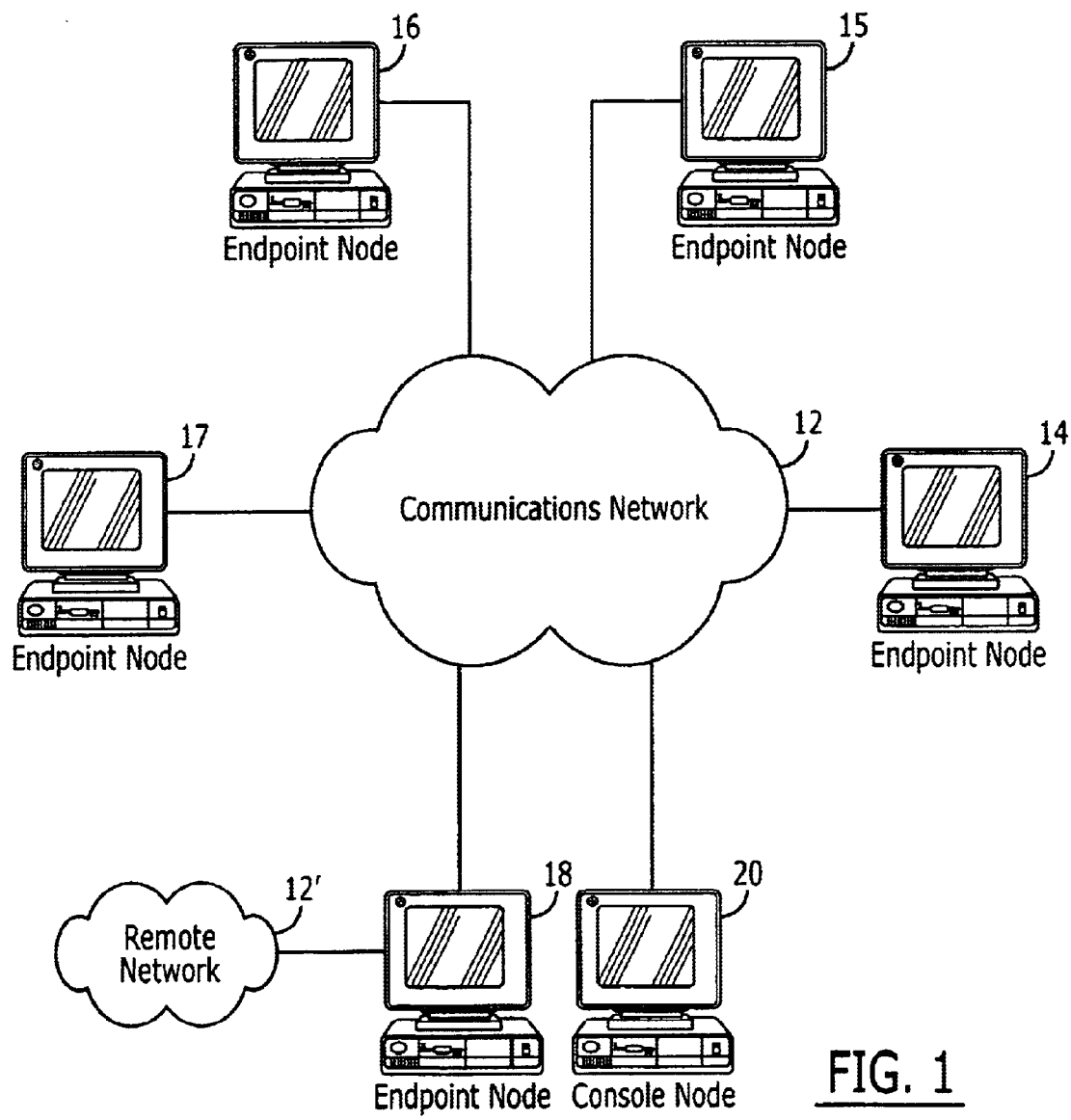
FIG. 1 schematically illustrates a hardware and software environment in which the present invention can operate.

Referring now to FIG. 1, a hardware and software environment in which the present invention can operate will now be described. As shown in FIG. 1, the present invention includes methods, systems and computer program products for analysis of data from testing the performance of a communications network 12. Communications network 12 provides a communication link between endpoint nodes 14, 15, 16, 17, 18 and console node 20. While the endpoint nodes 14, 15, 16, 17, 18 are illustrated as termination points on the communications network 12, it is to be understood that, as used herein, an endpoint node may also be implemented in a device, such as a computer, which operates as a router, switch or other network device in the communications network 12.

As will be understood by those having skill in the art, a communications network 12 may be comprised of a plurality of separate linked physical communication networks which, using a protocol such as the Internet protocol (IP), may appear to be a single seamless communications network to user application programs. For example, as illustrated in FIG. 1, remote network 12' and communications network 12 may both include a communication node at endpoint node 18. Accordingly, additional endpoint nodes (not shown) on remote network 12' may be made available for communications from endpoint nodes 14, 15, 16, 17, 18. It is further to be understood that, while for illustration purposes in FIG. 1, communications network 12 is shown as a single network it may be comprised of a plurality of separate interconnected physical networks or partitioned sections of a physical network. As illustrated in FIG. 1, endpoint nodes 14, 15, 16, 17, 18 may reside on a computer. As illustrated by endpoint node 18, a single computer hardware system may comprise multiple endpoint nodes. However, for purposes of simplifying the description herein, endpoint nodes and associated hardware will be generally referred to as a unitary element unless referred to otherwise.

Analysis of network performance test results according to a first aspect of the present invention, as illustrated in FIG. 1, may be provided by a designated console node 20. The console node 20 may also operate to control initiation and scheduling of endpoint node acquisition of data to provide test results for analysis. The test results may be obtained by active network testing or passive application monitoring at the endpoint nodes 14, 15, 16, 17, 18 with communications traffic over the communications network 12 being measured to provide test results, such as response time, transaction time, availability, throughput, and other measures as will be understood by those of skill in the art. While the console node 20 is illustrated in FIG. 1 as implemented on a single computer, it is to be understood that the console node 20 may be implemented in part on each of a number of computers. For example, a first computer could act as a server and a second computer could act as a client device executing a browser application allowing a user to access the server computer. The actual data, in turn, could be stored in a storage device at the server computer or located on a network storage device associated with a third computer, remote from, and accessible to, the server computer. In other words, for such an embodiment, the console node 20 would be implemented across three computer devices.

Figure 2:
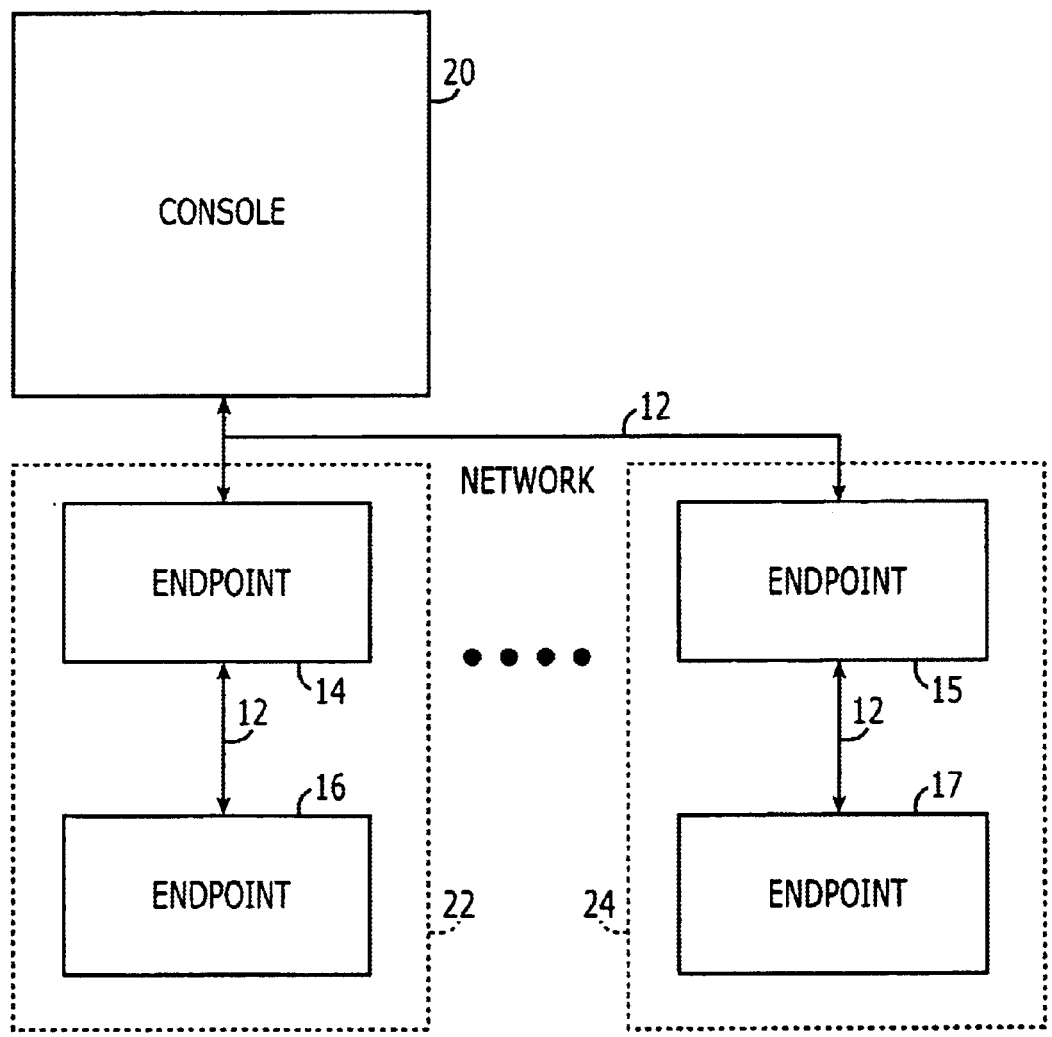
FIG. 2 is a block diagram of an embodiment of communications network performance testing according to the present invention.

As noted above, the present invention may be utilized for analysis of data from active test agents or passive application monitor agents. One such active agent is described in U.S. patent application Ser. No. 09/234,276 filed Jan. 19, 1999 and entitled "Methods, Systems and Computer Program Products for Scheduled Network Performance Testing" which is hereby incorporated by reference herein. As illustrated in the embodiment of an active system included in the block diagram of FIG. 2, application communication traffic may be simulated by communications between associated endpoint node pairs 22, 24. As illustrated in FIG. 2, endpoint node 14 and associated endpoint node 16 define a first endpoint node pair 22 associated with a first connection therebetween. Similarly, endpoint node 15 and associated endpoint node 17 define a second endpoint node pair 24 associated with a second connection. While it is preferred that application communication traffic be simulated by endpoint node pairs as illustrated in FIG. 2, it is to be understood that console node 20 may also perform as an endpoint node for purposes of a performance test. It is also to be understood that an endpoint node may be associated with a plurality of additional endpoint nodes to define a plurality of endpoint node pairs each associated with a connection and each of which may be provided a test schedule from the console node 20.

Console node 20 may obtain user input, for example by keyed input to a computer terminal or through a passive monitor, to define connections associated with pairs of endpoint nodes and a test schedule for each connection to test network 12. Console node 20, or other defining means may define a test schedule including a test protocol for the connections to simulate communications traffic between a plurality of selected endpoint nodes 14, 15, 16, 17, 18. Preferably, the test protocol is an endpoint pair based specific test protocol with a plurality of endpoint node pairs executing respective associated test protocols in accordance with a test schedule. Each endpoint node 14, 15, 16, 17, 18 may be provided endpoint node information including an endpoint node specific network communication test protocol for the connection and the associated test schedule. The endpoint node information may also include result reporting frequency, connection ID, endpoint 1 requirements, endpoint 2 requirements, threshold critical values and threshold normal values. Preferably, the network communication test protocols are based on a type of application communication traffic expected to provide a test protocol which simulates application communication traffic.

Console node 20, or other defining means, may define the connections and the test schedule for each connection including specifying the endpoint nodes associated with the connection and the underlying test protocols. Test protocols contain information about a performance test including what test scripts and network protocol to use for communications between each endpoint pair 22, 24 defining connections. A given test protocol may include a plurality of different test scripts. Examples of test protocols and methods for using test protocols in network performance testing suitable for use with the present invention are described in U.S. Pat. No. 5,838,919 titled "Methods, Systems and Computer Program Products for Endpoint Pair Based Communications Network Performance Testing" which is incorporated herein by reference in its entirety.

In one embodiment of the present invention, as illustrated in FIG. 2, a test schedule with endpoint information including an endpoint node specific test protocol including a test script is provided first to a single endpoint node 14, 15 in each endpoint pair 22, 24. Endpoint 1 nodes 14, 15 insure that they can communicate with their respective endpoint node partners 16, 17. The endpoint 1 nodes 14, 15 then communicate an associated partner endpoint node test protocol to their respective endpoint node partners (endpoint 2 nodes) 16, 17. The associated partner endpoint node test protocol may be transmitted each time the test protocol is executed pursuant to the test schedule, thereby treating the endpoint node partners 16, 17 as if they have never previously received the protocol and relieving the endpoint node partners 16, 17 of the need to maintain previously received protocols. Alternatively, network traffic may be reduced by saving the previously transmitted associated partner endpoint node test protocol at the endpoint node partners 16, 17 and transmitting an initiate request to the endpoint node partners 16, 17 when the endpoint 1 nodes 14, 15 determine from the schedule that execution is required.

In a further alternative embodiment, endpoint 1 nodes 14, 15 may determine a corresponding test schedule including a partner endpoint node test protocol from a received test schedule and communicate that to endpoint 2 nodes 16, 17. It is to be understood that the partner test schedule including the partner endpoint node test protocol may alternatively be determined and communicated to endpoint 2 nodes 16, 17 from console node 20.

In practicing the present invention, network performance test results are generally based upon timing measurements. Accordingly, in generating the test results for analysis, as each endpoint node pair 22, 24 reaches predetermined checkpoints within a script, it creates timing records. The timing records may be returned to console node 20 which may use them to analyze the performance of communications network 12 by calculating statistics. Preferably, the endpoint nodes (or one of each pair) calculate network performance test results or measurements for a variety of types of performance measurements, for example, response times, from the timing measurements and report the calculated test results periodically to console node 20. Network performance measurement test results may include throughput, transaction rate, availability and response time. The test schedules, in addition to providing test protocols, may provide a schedule for each connection. The schedule preferably specifies the start time for initiating execution of the associated test protocol and a repeat schedule for re-initiating execution of the associated protocol. An expiration time may also be included for terminating re-execution of the associated test protocol to allow independently operating endpoint nodes to age out a schedule to avoid unintended burdening of a network 12 with test traffic. The test schedules of the different connections may, optionally, be coordinated to test particular combinations of test protocols concurrently executing over communication network 12.

Console node 20 or other means for analyzing, may provide means for analyzing reported network performance test results from endpoint node 14 or other selected reporting endpoint nodes 15, 16, 17, 18 to generate the performance measurements, such as throughput, response time and transaction rate. Alternatively, endpoint nodes 14, 15, 16, 17, 18 may analyze network data for a connection and provide the resulting performance measurements to console node 20 as network performance measurement test results.

Console node 20, or other means for detecting communications capabilities, may also detect communications capabilities of endpoint node 14, 15, 16, 17, 18 before establishing a connection and a test schedule using endpoint node 14, 15, 16, 17, 18. A pre-setup flow may, optionally, be sent from console node 20 to each endpoint node 14, 15, 16, 17, 18 identified as part of a connection or the information may be otherwise provided. The presetup flow may include a requirements list. The requirements list may include a string of bytes which indicate what communications, or other (for example, random sleep), capabilities endpoint node 14, 15, 16, 17, 18 need to support in order to execute their endpoint node specific test protocol under the test schedule. For example, if a test protocol uses TCP/IP as the network protocol between an endpoint node pair 22 and the test script uses the Real-time Transport Protocol (RTP), the endpoint nodes of endpoint node pair 22 should support the following items which would be in the requirements list: User Datagram Protocol (UDP) and RTP (an optional feature built upon UDP to facilitate streaming of multimedia traffic). An active network test system including test schedules suitable for use with the present invention is described in U.S. patent application Ser. No. 09/234,276 filed Jan. 19, 1999 and entitled "Methods, Systems and Computer Program Products for Scheduled Network Performance Testing" which is hereby incorporated by reference herein in its entirety.

The description of FIG. 2 above was generally provided with reference to active agent operations in which application scripts are initiated pursuant to a schedule and generate network traffic which is measured and processed to provide performance measurements. However, the console node 20 may also provide for initiation and analysis of passive application monitor generated network performance measurement test results. Preferably, both active and passive acquired test results are provided for analysis. Systems, methods and computer program products providing for both passive and active network testing which are suitable for use in providing data for analysis according to the present invention are described in concurrently filed U.S. patent application Ser. No. 09/479,565 entitled "Methods, Systems and Computer Program Products for Network Performance Testing Through Active Endpoint Pair Based Testing and Passive Application Monitoring" which is hereby incorporated herein by reference as if set forth in its entirety.

As described therein, application monitoring for one or more applications executing on one or more of the endpoint nodes 14, 15, 16, 17, 18 may be initiated by the console node 20 to generate passive application monitoring test results for analysis. Such results may be associated with applications executing on the endpoint nodes 14, 15, 16, 17, 18 and may also be associated with each of the endpoint nodes participating in a communication connection over the communications network 12. For example, in a client-server network environment, passive application monitoring can be selected for client devices and the generated test results may be associated with the client device, the server device and the application being monitored which generates traffic between the client and the server. As a result, performance can be analyzed broken down by client, server and application. Examples of applications to be monitored include Telnet, FTP, Lotus Notes, POP3 email, DNS, Web and other applications as will be understood by those of skill in the art which communicate, for example, using assigned ports of the client devices. The communication flows may be monitored, for example, by monitoring TCP protocol stacks associated with the assigned ports of the client devices.

Passive application monitor agents including system monitors may be provided at both client and server devices to monitor performance of the computer devices, such as CPU utilization, paging and disk I/O for the various computers supporting client and server operations. System monitoring functions, as used herein, are those typically directed to isolating performance problems on the client or server computer devices rather than on the network itself.

Scheduling of performance monitoring operations for an application monitor agent may proceed in a manner substantially the same as was described above with reference to active network testing in which scheduling of execution of application scripts is provided from a central console node 20 to a plurality of endpoint nodes 14–18. However, it is to be understood that parameters to be specified for application monitoring may include a select flag activating application and/or system monitoring, and an accumulation schedule for application monitoring or system monitoring data. This setup information may further specify the application(s) to be monitored, an associated port identification (range) for the applications which are to be monitored and other information, as will be understood by those of skill in the art allowing application monitor agents on an endpoint node 14, 15, 16, 17, 18 to associate monitored network communication flows with a particular application and to further associate such flows with a remote device which is communicating with the application resident on the computer in which the application monitor is executing. Accordingly, as with the accumulation of data broken down by first and second endpoint and application script for an active monitor as described above, passive application monitoring may provide generation of data which may be broken down by client and server and by application program being monitored. The resulting data from application monitoring will be further described with reference to the dynamic filtering aspects of the present invention.

Figure 3:
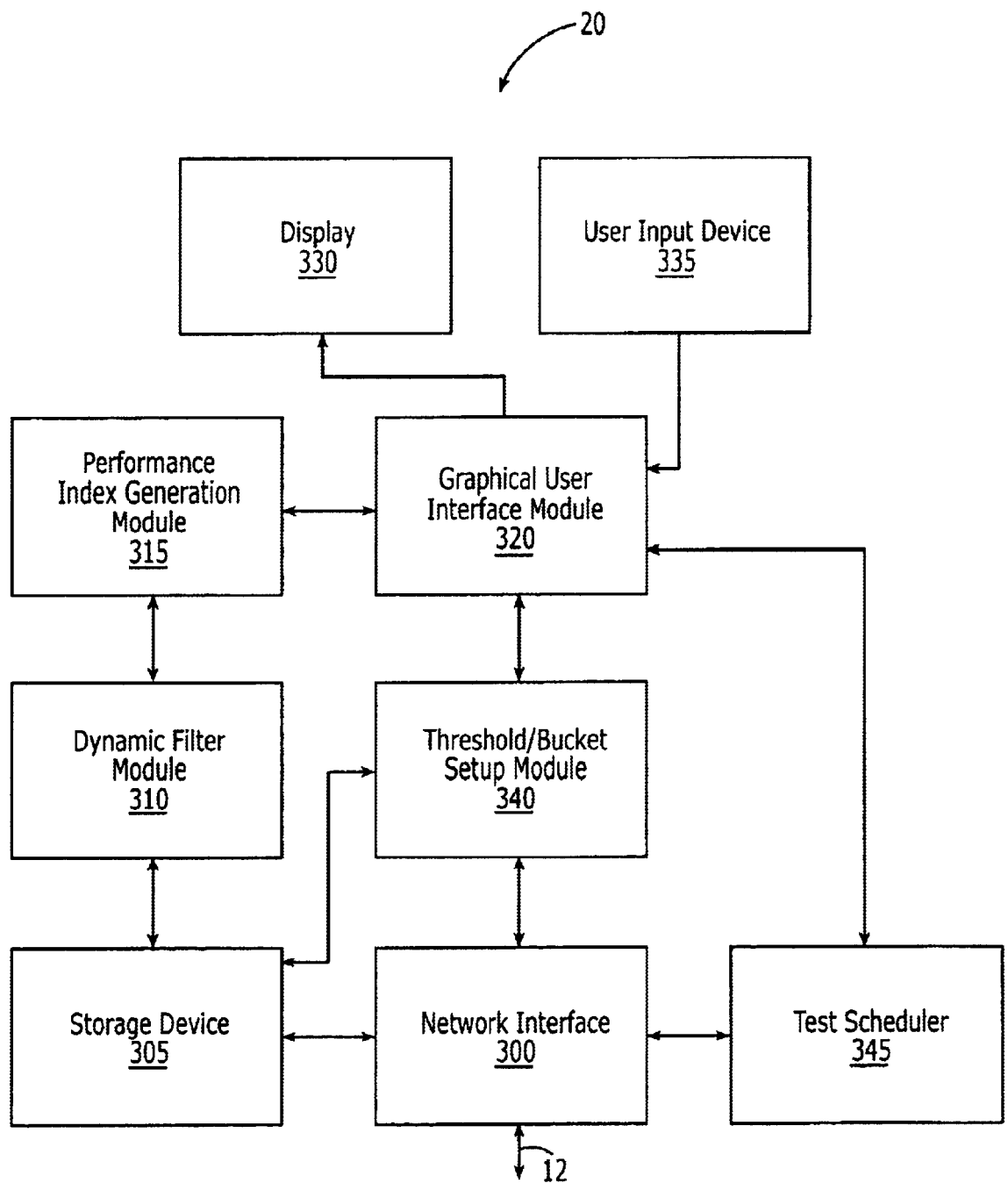
FIG. 3 is a block diagram of an embodiment of a console node according to the present invention.

An embodiment of a console node 20 providing for dynamically filtering network performance test results will now be further described with reference to the block diagram illustration of FIG. 3. As shown in the embodiment of FIG. 3, the console node 20 includes a network interface 300 coupled to the communications network 12. A storage device 305 stores network performance test results obtained from the endpoint nodes 14, 15, 16, 17, 18. The stored network performance test results may be derived from active network testing or passive application monitoring operations by the endpoint nodes 14, 15, 16, 17, 18.

A dynamic filter module 310 is configured to filter the network performance test results from the storage device 305 based on user selection inputs. Preferably, the dynamic filter module 310 is configured to filter network performance test results by application or device. The dynamic filter module 310 selects network performance test results associated with the application or device selected by a user and provides the associated network performance test results to a performance index generation module 315 as filtered results. For example, the dynamic filter module 310 may initially filter the network performance test results to group the results by application so that the performance index generation module 315 may generate an overall performance index and associated trend for each application for which data is contained in the storage device 305. The plurality of applications may be application programs executing on the endpoint nodes 14, 15, 16, 17, 18 and the network performance test results may be based on passive monitoring of the application programs executing on the endpoint nodes 14, 15, 16, 17, 18.

The dynamic filter module 310 may further filter the network performance test results by, for example, selecting only the test results associated with a specific application selected by a user and group the results for the selected application by a device associated with the test results for that selected application. For example, the endpoint node 14 and the endpoint node 15 may each be one of the plurality of devices for which separate data sets are generated by the dynamic filter module 310 and provided to the performance index generation module 315 to generate the performance indexes and associated trends for each of the respective endpoint node devices 14, 15 for the application selected by a user.

In addition, the illustrated console node 20 in FIG. 3 includes a graphical user interface module 320 which interfaces to a display 330 and a user input device 335, such as a mouse or a keyboard device. The graphical user interface module 320 is configured to display performance indexes and associated trend information from the performance index generation module 315 on the display 330 as well as displaying other information related to user communications. The graphical user interface module 320 is further configured to receive user input from the user input device 335, such as a selection of a filter criteria (i.e., a selected application or device name), and provide the user input to the other modules of the console node 20 such as the dynamic filter module 310.

The console node 20 illustrated in FIG. 3 further includes a threshold/bucket setup module 340. The threshold/bucket setup module 340 may be configured to designate a number of data buckets and an associated value range for each of the data buckets for use in recording network performance measurements. The determined data bucket information may be generated for each of a plurality of different types of network performance measurements such as response time and throughout. As shown in FIG. 3, the threshold/bucket setup module 340 may provide the determined bucket information to the network interface 300 for transmission to the endpoint nodes 14, 15, 16, 17, 18 to be used by the endpoint nodes 14, 15, 16, 17, 18 in accumulating network performance test results. In this case, the network performance measurements may be provided to the console node 20 from the endpoint nodes 14, 15, 16, 17, 18 by transmission of counts for each of the respective buckets from the endpoint nodes on a periodic basis or on request. The data buckets may also be maintained on the storage device 305 in which case measurement provided by the endpoint nodes 14, 15, 16, 17, 18 may be individual measurement values which may be recorded by incrementing a corresponding one of the designated data buckets having an associated range including the measurement value in the storage device 305. Preferably, the data bucket structure is provided at the endpoint nodes 14, 15, 16, 17, 18.

Finally, a test scheduler 345 is shown as being included in the console mode 20 in the embodiment of FIG. 3. The test scheduler 345 may provide for transmission of test schedules related to active network testing to the endpoint nodes 14, 15, 16, 17, 18 and may further provide for transmission of designations of applications for which passive application monitoring is requested to the endpoint nodes 14, 15, 16, 17, 18.

Operations of the present invention will now be described with respect to the flowchart illustrations of FIGS. 4 through 8. It will be understood that each block of the flowchart illustrations and the block diagram illustrations of FIGS. 1–3 and combinations of blocks in the flowchart illustrations and the block diagram illustrations, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions. For example, the dynamic filter module 310 may be implemented as code executing on a processor, as custom chips or as a combination of the above.

Figure 4:
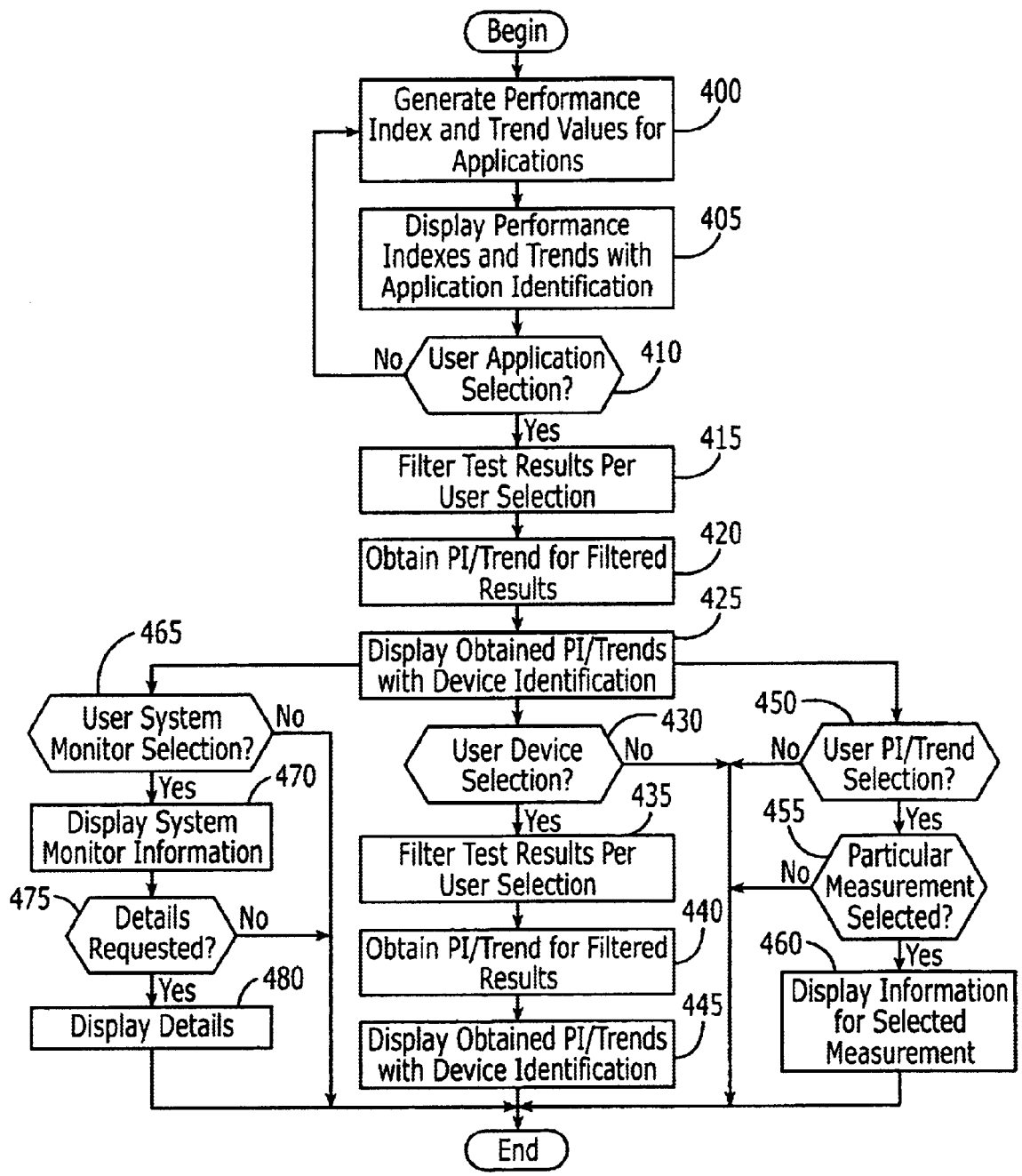
FIG. 4 is a flowchart illustrating operations for dynamic filtering of network performance test results according to an aspect of the present invention.

Referring now to the flowchart illustration of FIG. 4 operations for an embodiment of dynamic filtering of network performance test results according to an aspect of the present invention will be further described. Operations begin at block 400 with the generation of performance index and associated trend values for each of a plurality of different applications for which network performance test results are available. It is to be understood that, while the present invention will be described with reference to the embodiment of FIG. 4 as starting with groupings of results by application type followed by device identification, the present invention may also be implemented by first grouping results by device identification and then subsequently by application type with respect to selected devices. Furthermore, the invention will be described with reference to selection of an application followed by a first, such as a client, device and then again followed by a second, such as a server, device. However it will be understood that the sequence may be varied generally in keeping with the teachings of the present invention.

The performance index for each one of the plurality of applications along with the associated trend is displayed along with an identification of each of the plurality of applications (block 405). As will be further described with reference to FIGS. 9A–9E herein, the display may take a table format presented to the user on a display 330 with each application being provided a row and a performance index, such as severity index and trend each being provided a column and represented by a graphical image (icon) index which, in turn, may be enhanced by color information to highlight potentially problematic conditions to a user (for example, see FIG. 9A). In addition, the time period over which the performance indexes and trend values are generated may also be user selectable. The user may then interface to the user input device 335, for example, by clicking with a mouse device, on an application identification of interest to initiate further dynamic filtering of the network performance test results. If no user application selection is received, the display information may periodically be updated by repeating operations at blocks 400 and 405.

When a first user application selection is received (block 410) the network performance test results may be filtered to provide network performance test results associated with the selected one of the applications as first filtered results (block 415). Performance indexes are obtained along with associated trend information for each of a first plurality of devices, which will be identified as "clients" in the context of the example of FIG. 4 (block 420). In other words, each client having network performance test results for the selected application will be separately provided an associated performance index and trend based on network performance test results associated with both the selected application and each respective client device. The obtained performance indexes for each of the clients along with the associated trend information may then be displayed along with associated identifications of the clients (for example, see FIG. 9A)(block 425).

It is to be understood that, where passive application monitoring data is utilized, the applications may be application programs executing on a plurality of clients. Similarly, where the network performance test results are based on active network testing, the applications may be application scripts which may be based on an expected application type utilizing the communications network 12 and the first plurality of devices referred to above as the clients may be the first endpoint nodes 14, 15 of a plurality of endpoint node pairs.

Additional dynamic filtering steps may be provided as illustrated in FIG. 4 with a second user selection of one of the devices (block 430). The first filtered test results may then again be filtered based on the second user selection of one of the clients to provide second filtered results (block 435). More particularly, for the embodiment illustrated in FIG. 4, the network performance test results associated with the originally selected application and client are broken down by server device associated with each of the network performance test results and a performance index and associated trend for each of the server devices based on the filtered results is then obtained (block 440). The obtained performance index and trend information may then be displayed along with an associated device identification for the server (block 445). Alternatively, as shown in FIGS. 9A–9E, the first plurality of devices (displayed at block 425) may be client (or server) locations each including a number of individual clients (or servers) and the second plurality of devices (displayed at block 445) may be the individual clients (or servers) for a selected location.

While no further iterations are illustrated in the embodiment of FIG. 4, dynamic filtering operations may continue responsive to user selection, for example, by representing the data from a particular server broken down by server name. Similarly, the first device grouping at blocks 415 through 425 may be based on associated server with the second device grouping at blocks 435 through 445 being based on client. The generated performance index values at blocks 400, 420 and 440 may be a severity index based on a number of exception events for each of a plurality of types of network performance measurements as will be further described with reference to FIG. 7. The types of network performance measurements may include throughput, response time, application availability and transaction rate. The exception events may be detected using autothresholding with user sensitivity according to a further aspect of the present invention as will be described with reference to FIG. 8. Furthermore, the test results may be recorded for both the unfiltered and filtered test result groupings using data buckets as will be described with reference to a further aspect of the present invention shown in FIG. 6.

Further aspects of particular embodiments of the present invention are also illustrated in FIG. 4. In one aspect, in addition to active network testing and passive application monitoring data, system monitoring data is also provided responsive to a user selection of system monitor display information (block 465). System monitor information may be displayed on the display 330 (block 470). As noted above, system monitor information generally refers to information related to a particular hardware device such as those associated with particular endpoint nodes, 14, 15, 16, 17, 18. Such performance results may, for example include CPU usage, disk I/O performance (for example in bytes/second) and memory paging (in bytes/second). Other measurements of system hardware performance may be provided as will be understood by those of skill in the art.

In addition, according to the system monitor display aspect of the present invention, a user may select detailed data (block 475) in which case the underlying details supporting the summary information displayed at block 470 may be displayed for a user in graphical or report (text and/or tabular) format (block 480). Underlying details for displayed performance indexes or trends displayed at blocks 405, 425 and 445 may also be requested by a user. For example, as shown for an exemplary one of the blocks (block 425) in FIG. 4, a user may select details on the performance index or its associated trend by, for example, clicking on the displayed graphical representation (block 450) to display additional information. Preferably, aggregate results are provided in either a graphic or text form for a performance index, such as a severity index, and the results for each of the underlying performance measurement types, such as the response time are separately displayed. The user may also select one of the underlying performance measurement types to obtain further detail (block 455). Additional information for the selected measurement type may then be displayed (block 460). Again, either a graph or a text type display may be used as may be deemed most appropriate to facilitate user understanding. Alternatively, both a graphic and a text type format may be user selectable.

Figure 5:
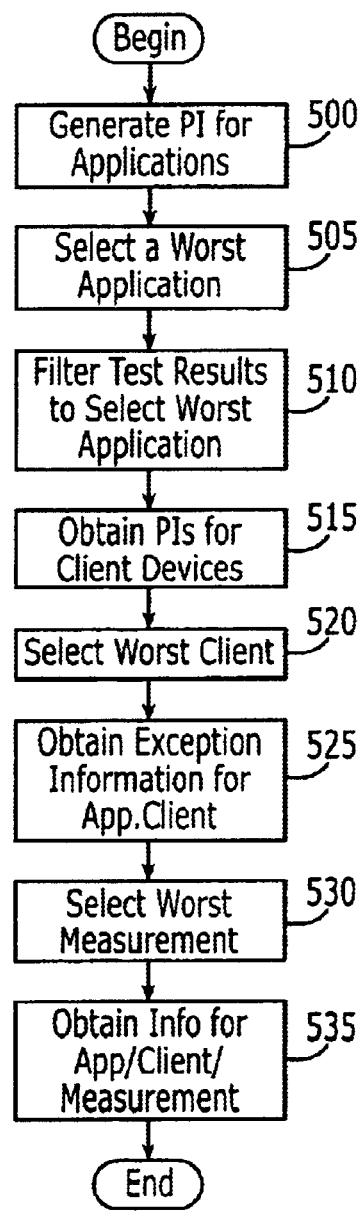
FIG. 5 is a flowchart illustrating operations for identifying a network performance problem based on network performance test results according to another aspect of the present invention.

Referring now to the flowchart illustration of FIG. 5, operations for identifying a network performance problem based on network performance test results according to an embodiment of the present invention will now be further described. Operations begin at block 500 with generation of a performance index (PI) for each of a plurality of applications. It is to be understood that, as with reference to FIG. 4, while operations will be described from the perspective of starting with groupings by application followed by grouping by device, the present invention equally applies to operations for identifying the network performance problem based first on groupings by device followed by a breakdown into groupings by application for selected devices. Continuing with the embodiment illustrated in FIG. 5, one of the displayed applications with the worst generated performance index is then selected to provide a first selection (block 505). The network performance test results are then filtered based on the first selection to provide first filtered results with the network performance test results for the selected application being broken down into a first plurality of associated device groupings, such as client or server (block 510). As will be described herein, operations at block 510 will be assumed to break down the network performance test results for the selected application by associated client.

Performance indexes for each of the client (or client location) devices are then obtained based on the first filtered results responsive to the first selection (block 515). The client with the worst one of the obtained performance indexes is then selected to provide a second selection (block 520). Information related to a number of exception events for each of a plurality of types of network performance measurement test utilized in generating the performance index is then obtained responsive to the selection of the client with the worst performance index (block 525). As will be further described with reference to FIGS. 9A–9E the exception event information may be provided responsive to a user selection of the severity index icon in the row of the worst performing client rather than selection of the client itself as was described with reference to operations in FIG. 4.

Based on the display of exception event information for a particular application and client device, a user may further select a worst one of the performance measures for the selected application and client (block 530). For example, a user may select the particular performance measure having the greatest number of exception events. The user selection may be provided from a number of different alternative selection options, each providing a different format of underlining detail related to the selected performance measurement as will be further described with reference to FIGS. 10A–10E and 11A–11E (for trends) (for severity indexes). Information related to the worst one of the network performance test types based on the number of exception events is then obtained responsive to the selection at block 530 (block 535).

More generally, dynamic filtering operations, as described with reference to FIG. 4 with each application or device selection drilling down to a smaller data set, may be repeated until the network performance test results are filtered down to the smallest data set that still shows a problem. In other words, while the embodiment illustrated in FIG. 5 only shows filtering down through a single application and client selection, additional filtering may be provided before operations related to selection of a worst measurement characteristic based on a display of exception information at blocks 525 through 535 are executed. By way of example, if a particular application, such as SAP R/3 has a high severity index, filtering operations may drill down by selection of the SAP R/3 application icon to shown client locations that are using SAP R/3. If one location is identified that is worse than the others, that location may be selected to drill down on that location to show all clients by name from that location.

In other words, the first plurality of device grouping by client may be a grouping by client location, such as geographic region, with the second plurality of devices selectable after choice of a client location displaying individual client identifications for each client device located at the client location. The client location groupings and, similarly, server location groupings, may be user defined based on the particular configuration of a communications network 12 to facilitate the most useful presentation of information. As with drilling down using dynamic filtering to client identification, a similar operation may be provided with reference to server locations and server names for a particular client to identify any additional devices associated with a performance problem.

Once the network performance test results are filtered down to a smallest data set still showing a problem, the severity index icon for a row of interest may be selected to generate a report which contains a composite index graph for the severity index followed by underlying measurement types such as response time, throughput and availability exception graphs (block 525) as will be further described with reference to FIGS. 10A–10E. Display of information related to each of the individual performance measurement types, such as response time, may be further broken out to identify whether a problem is associated with a client machine, the network or server machine, for example by displaying the percentage of transaction time taken up by each component of a connection (See FIG. 10C). The overall magnitude of the respective client, network, and server times may also be referred to so as to generally gauge the magnitude of the delay times to determine if any of them are large enough to indicate a user detectable problem in performance.

Problem identification operations once a particular hardware associated device is identified may further utilize the system monitor aspects of the present invention described with reference to blocks 465 through 480 of FIG. 4. For example, if it appears the client time is taking up a disproportionate percentage of overall transaction time system, status information related to the client device CPU utilization, disk I/O volume and operational paging may be selected by a user and displayed. Similarly, if server time is taking up a disproportionate percentage of the overall transaction time, system status information related to the server device may be presented. Direct access to system monitor information from an application response time display may be provided by a user selectable link which will initiate presentation of system monitor information for the selected device on the display 330.

One function which may be provided through analysis of network performance test results is detection of exception events (i.e., events which may require attention from the IT staff such as poor response times or throughput). Accordingly, for this and other reasons it may be desirable to accumulate large numbers of samples as these larger sample sizes may improve the reliability of exception reporting and trending of network performance. One known approach to limiting the storage requirements for such large volumes of data is the use of data buckets. A data bucket is associated with a range of values and a count in a respective bucket is incremented for each data point falling within the range of the bucket.

Figure 6:
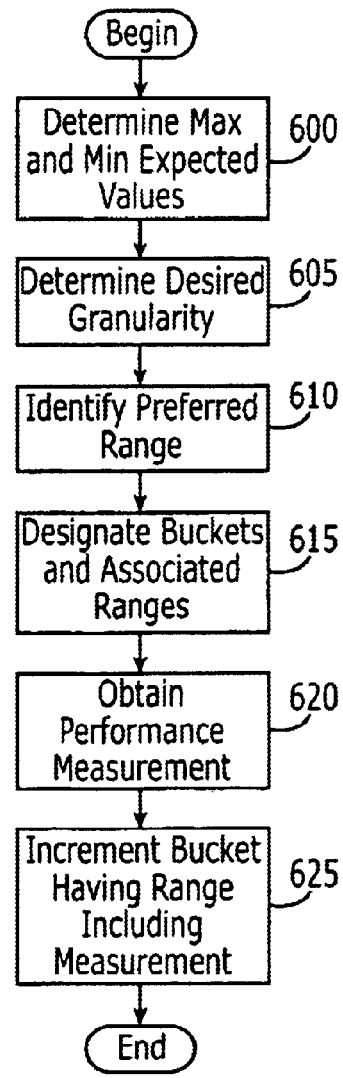
FIG. 6 is a flowchart illustrating operations for recording network performance measurements according to a further aspect of the present invention.

Referring now to the flowchart illustration of FIG. 6 operations according to an embodiment of a network performance measurement recording aspect of the present invention utilizing data buckets will now be described. In accordance with this aspect of the present invention, a number of data buckets and an associated range for each of the data buckets is designated for each of the types of network performance measurements. In other words, separate sets of data buckets may be established for response time, throughput, application availability, etc. Note that data buckets may be utilized for recording measurements such as CPU, disk I/O and paging as well as the previously identified types of network performance measurements. The data buckets may be implemented as memory addresses in the storage device 305 and further may be implemented as memory locations in associated storage devices associated with the various endpoint nodes 14, 15, 16, 17, 18. The size may further be selected based upon the associated accumulation period. For example, a plurality of sets of data buckets may be provided for each type of performance measurement, each set being associated with a different accumulation period. Response time, for example, could be tracked in one hour intervals, one day intervals, one week intervals and so on with separate sets of data buckets for each time interval.

Furthermore, a plurality of sets of data buckets could be provided each having a uniform length of duration but covering a different time period. For example, twenty-four sets of data buckets each having an associated accumulation period of one hour could be provided to cover a one day period with information related to the full twenty-four hour period being generated by summing the amounts from each of the twenty-four individual hour records. The summed amounts could then be stored as data for a past week and the individual hour data bucket sets could then be reinitialized for use in a subsequent period, or deleted.

As used herein, the range for an individual data bucket refers to the minimum measurement value and maximum measurement value associated with the bucket. Individual network performance test measurement results falling between the minimum and maximum values (for example, in a range minimum<=measurement value<maximum) may then be treated as belonging in that associated data bucket resulting in an incrementing of a count in the corresponding data bucket as will be described further herein. One bucket of the finite number of buckets may be provided an unlimited maximum (or minimum) to encompass an infinite number of possible measurement values with a finite number of buckets.

Operations begin at block 600 with determination of a maximum and a minimum expected value for a respective network performance measurement (block 600). A desired granularity for the network performance measurement is also determined (block 605). In the illustrated embodiment of FIG. 6, a first range of values between the maximum and minimum expected values for the type of network performance measurement is identified as a preferred range (block 610). The number and associated ranges of the buckets for the network performance measurement are then determined based on the maximum and minimum expected values and the desired granularity (or granularities where a preferred range is identified) (block 615).

By way of example, if expected measurement values range from zero to ten and a granularity of one is desired with no preferred range, ten buckets may be allocated with each bucket having a range of one. The first bucket will then have a minimum value of zero and an associated maximum of one, a second bucket would then range from one to two and so on. Where a preferred range is identified, for example, an expected range of performance threshold criteria for the network performance measurement type, a portion of the number of data buckets may be associated with the preferred range which exceeds a ratio of the preferred range to the overall range between the maximum and the minimum expected value, thereby providing an increased granularity in the preferred range. Stated differently, one or more of the data buckets within the measurement range associated with expected threshold criteria may be provided individual ranges (widths) which are smaller than those provided for the data buckets in other regions of the range of expected measurements for the network performance measurement type. The highest value bucket may be considered to have no upper limit so actual readings exceeding the expected maximum will increment the highest value bucket count.

Once one or more sets of data buckets are established for a respective network performance measurement type and associated with accumulation periods, they may be initialized appropriate to the respective accumulation periods and network performance measurements may then be obtained which are based on communication transactions over the communications network period (block 620). One of the designated data buckets having an associated range including the obtained one of the network performance measurements is then incremented to record the network performance measurement (block 625).

Note that operations related to designating the number and associated range for the data buckets at blocks 600 through 615 are preferably done in advance as an initial setup in advance of obtaining measurements and need not be dynamically updated based on the obtained measurements subsequently. In determining the width of each bucket range, it may be desirable to consider how to represent what may be widely varied measurements within a finite set of data buckets, without significantly sacrificing the accuracy of the measurements. In general, small measurements may require finer granularity in order to correctly characterize the measurements and detect changes and trends. Large measurements tend to require less granularity. Fine granularity of large measurements may impose an additional storage cost while providing little or no benefit when characterizing the measurements. As embodied by the invention, the range of each data bucket preferably varies in order to provide increasing granularity for larger measurements. The range of each bucket may be determined empirically or algorithmically.

Figures 7, 8:
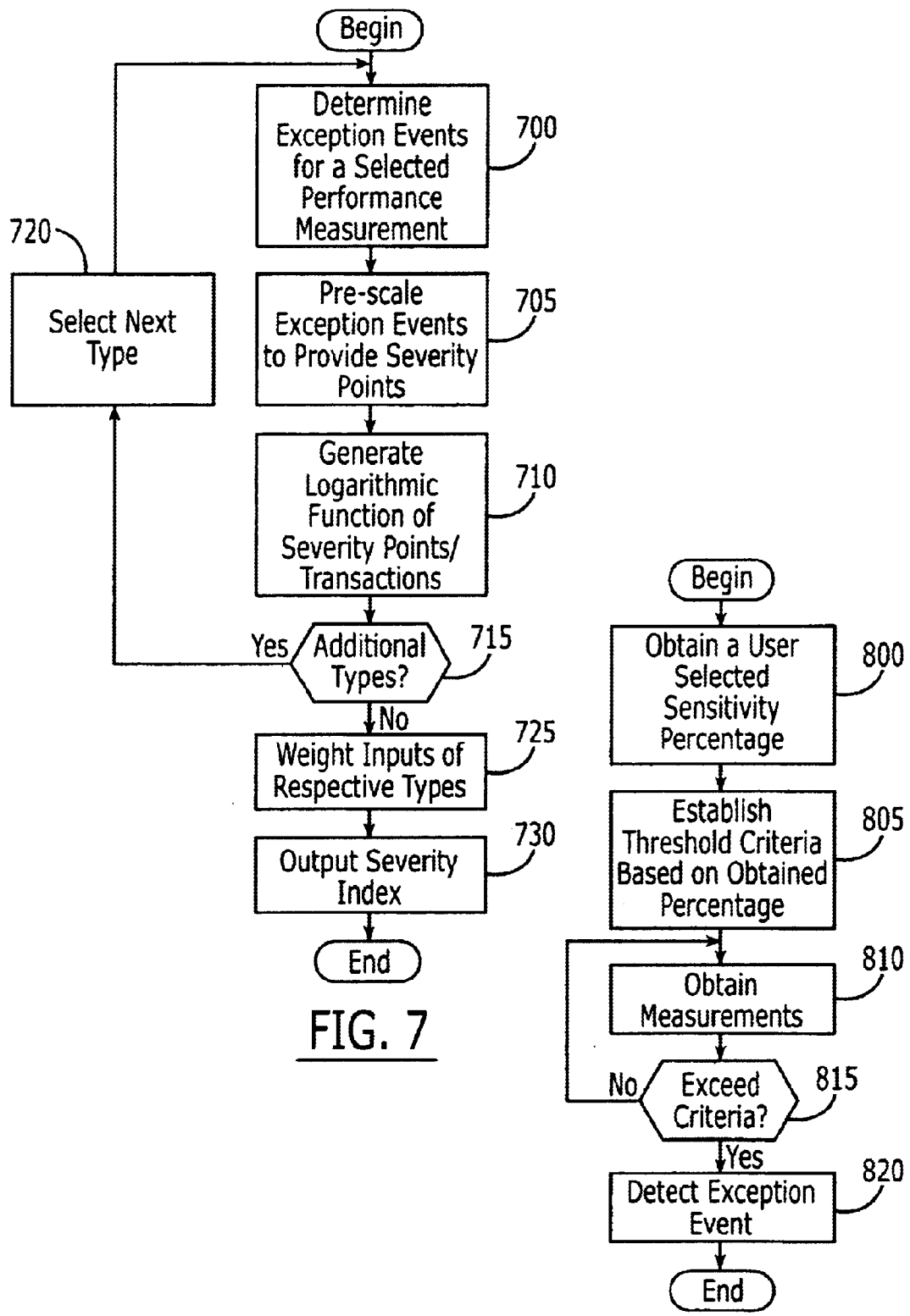
FIG. 7 is a flowchart illustrating operations for characterizing performance of a communications network according to another aspect of the present invention.
FIG. 8 is a flowchart illustrating operations for establishing threshold criterion for detecting exception events according to a further aspect of the present invention.

Referring now to the flowchart illustration of FIG. 7, operations according to an embodiment of characterizing performance of a communication network using a severity index as the performance index will now be described. Operations shown in FIG. 7 illustrate an embodiment of operations for generating a severity index associated with an application or device connected to the network based on the number of exception events for each of a plurality of types of network performance measurements (i.e., test types). It is to be understood that, as was described with reference to FIG. 4, individual measurement records utilized in generating the severity index may have an identifier associating the respective records with a particular application and further with one or more devices such as a client and server. The severity index itself may be associated with combinations of applications and devices based upon the dynamic filtering sequence which generated the underlying test data set used for calculation of the severity index as was described with reference to FIG. 4.

Operations begin at block 700 with the determination of exception events for a selected performance measurement type, such as response time. The exception events in the illustrated embodiment of FIG. 7 are pre-scaled based on a degree of deviation of the exception event (block 705). Preferably, the prescaling is based on a larger degree of deviation providing a greater magnitude of severity which may be expressed as severity points. Exception events may include availability for the connection with connectivity (availability) values, preferably, being given a highest weight in computing a severity index. A logarithmic function of a ratio of the severity points to a total transaction count over which the severity points were obtained is generated (block 710). If additional types of network performance tests are to be utilized in generating the composite severity index (block 715), a next type is then selected (block 720). For example, in addition to response time, throughput, transaction rate and/or application availability exception events may be factored in to the generated severity index. Operations then repeat at block 700 through 715 for each of the respective network performance measurement test types. Each of the plurality of types of network performance tests may be provided a selected weighting in the severity index (block 725). The severity index may then be output, for example, on the display 330, and may further be output to the storage device 305 for use in generating trend information associated with the severity index (block 730).

In one embodiment, the severity index may be calculated as will now be described. Note that, for this illustrative example, the weighting provided to each of three types of network performance tests is equal. The severity index for each is provided as:

$$\text{Severity Index} = \log(ppt*200)*100/3 \tag{1}$$

where ppt is the severity points per transaction count. A point scale of 0 to 5 may be provided with 0 for <1× the threshold; 1 for 1× to 2× of the threshold and so on with a 5 for availability loss as one way to provide additional weighting where desired for the availability type of network performance measurement.

An exemplary trend calculation is as follows for each of response time (RI), throughput (Thru) and availability (Avail):

$$RT\_Trend = \log(|((last\_trendpoint/first\_trendpoint)-1)*1000|)*12.5/3 \tag{2}$$

$$Thru\_Trend = \log(|((last\_trendpoint/first\_trendpoint)-1)*1000|)*12.5/3 \tag{3}$$

$$Avail\_Trend = \log(|((last\_trendpoint/first\_trendpoint)-1)*1000|)*25.0/3 \tag{4}$$

These equations provide a scaling from −50 (improving quickly) to +50 (deteriorating quickly) with a 0 for no change. In addition, each number above may be capped at 100% change and negated if improving to provide a composite trend as:

$$\text{Trend} = (RT\_Trend + Thru\_Trend + Avail\_Trend) \tag{5}$$

In other words, for example, when response time measurements are improving (i.e., getting shorter), the response time trend (RT_Trend) is negated before inclusion into equation 5.

Referring now to the flowchart illustration of FIG. 8 operations according to an embodiment of an aspect of the present invention related to automatically establishing a threshold criteria for a network performance measurement to detect a network performance exception event will now be described. As will be described, this aspect of the present invention provides for automatically establishing the threshold criterion based on a specified percentage of baseline results for the network performance measurement type and may further provide for a user selected sensitivity of the threshold determination.

Operations begin at block 800 when a user selected sensitivity percentage for the network performance measurement type is obtained. The threshold criteria is then established based on the obtained percentage (block 805). By way of example, if a user selects 90% an increased sensitivity for detection of exception events may be provided as contrasted with a sensitivity percentage of 95%, 98% or so on. Where a sensitivity percentage of 100% is selected, substantially no exception events will be detected for the corresponding performance measurement type (in other words, when a user selects a percentile in this example it indicates the percentile at which the threshold will be set, thus selecting a lower percentile provides a more sensitive threshold). Similarly, the data bucket aspect of the present invention may be beneficially applied by selecting the data buckets configuration to provide the desired granularity within the threshold criteria range to improve the sensitivity of exception event detection. The level for the respective network performance measurement type associated with the threshold criteria (i.e., in the units of the measurement type the value corresponding to the selected percentile) is preferably automatically updated as the historical data contained in the data buckets is changed.

When using data buckets, rather than raw data values, to calculate a level for the respective network performance measurement type associated with a threshold criteria percentage, the distribution of measurements within individual buckets is preferably assumed to be uniform. In other words, if a threshold of 90% is specified and the data buckets to be used for determining a corresponding level for a 90% criterion contain a total of one-hundred counts, the level for detection of an exception event should be chosen so that only ten of the one-hundred recorded results would exceed the level of the threshold criterion. If an Nth bucket is then selected having eighty-eight of the counts contained in lower range buckets, eight in higher range buckets and four contained in the bucket which includes the 90% threshold level, the four measurements within the Nth bucket are treated as uniformly spaced between the minimum and the maximum value associated with that bucket. In this example, the value for the performance measurement would, therefore, fall in the middle of the Nth bucket and the threshold criteria for detection of exception events would be set at a value halfway between the minimum value and maximum value defining the range of the Nth bucket. Actual measurements would then be compared to this value to determine if an exception event has occurred. Additional aspects of authothresholding, such as providing a hysterises in threshold detection for exception events and/or requiring multiple consecutive readings above the threshold criteria may be provided as described, for example in U.S. patent application Ser. No. 09/234,276 previously incorporated by reference herein.

Accordingly, referring again to the illustration of FIG. 8 measurements are obtained (block 810). If the threshold criterion is exceeded (block 815) an exception event is detected and recorded (block 820).

Figure 9A:
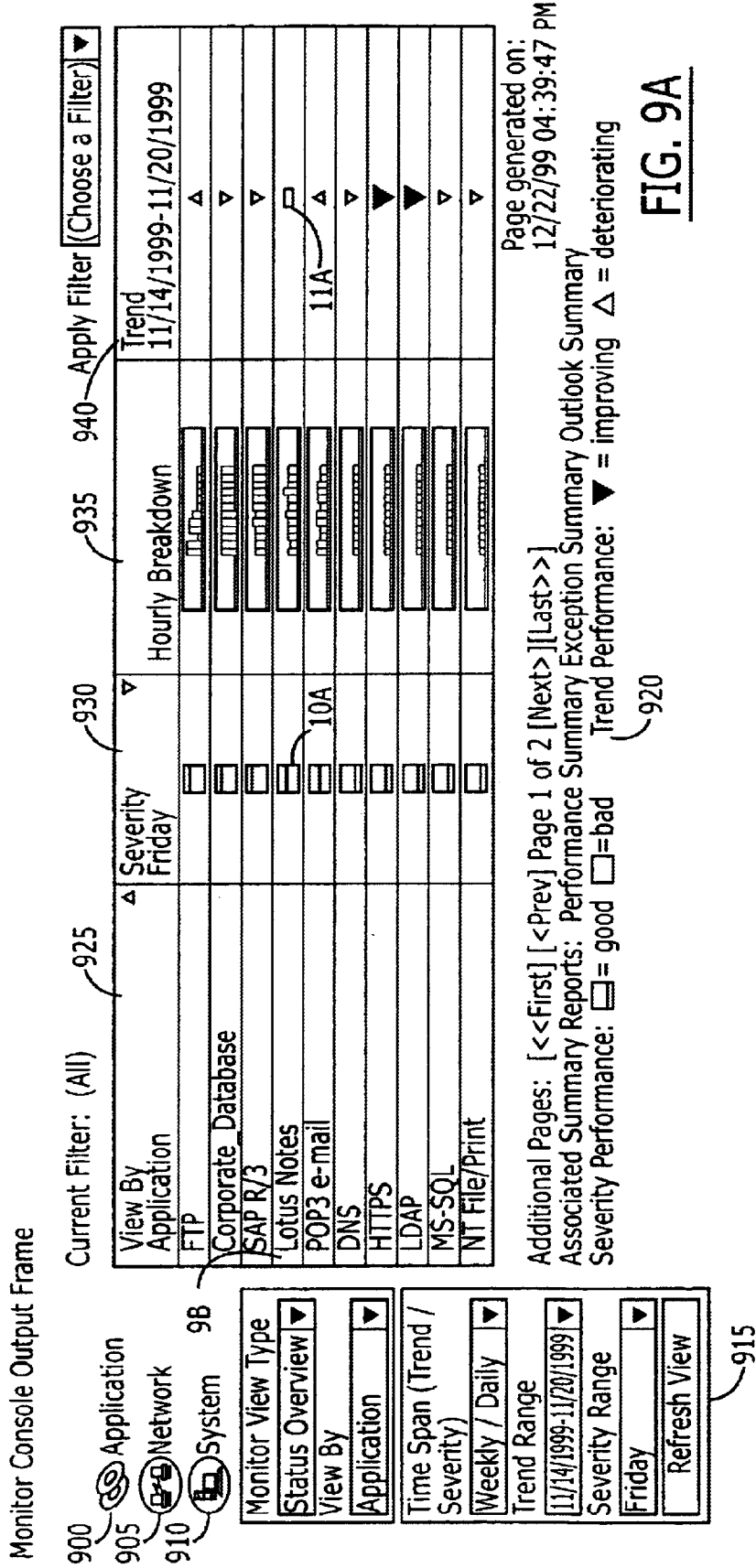
Figure 12:
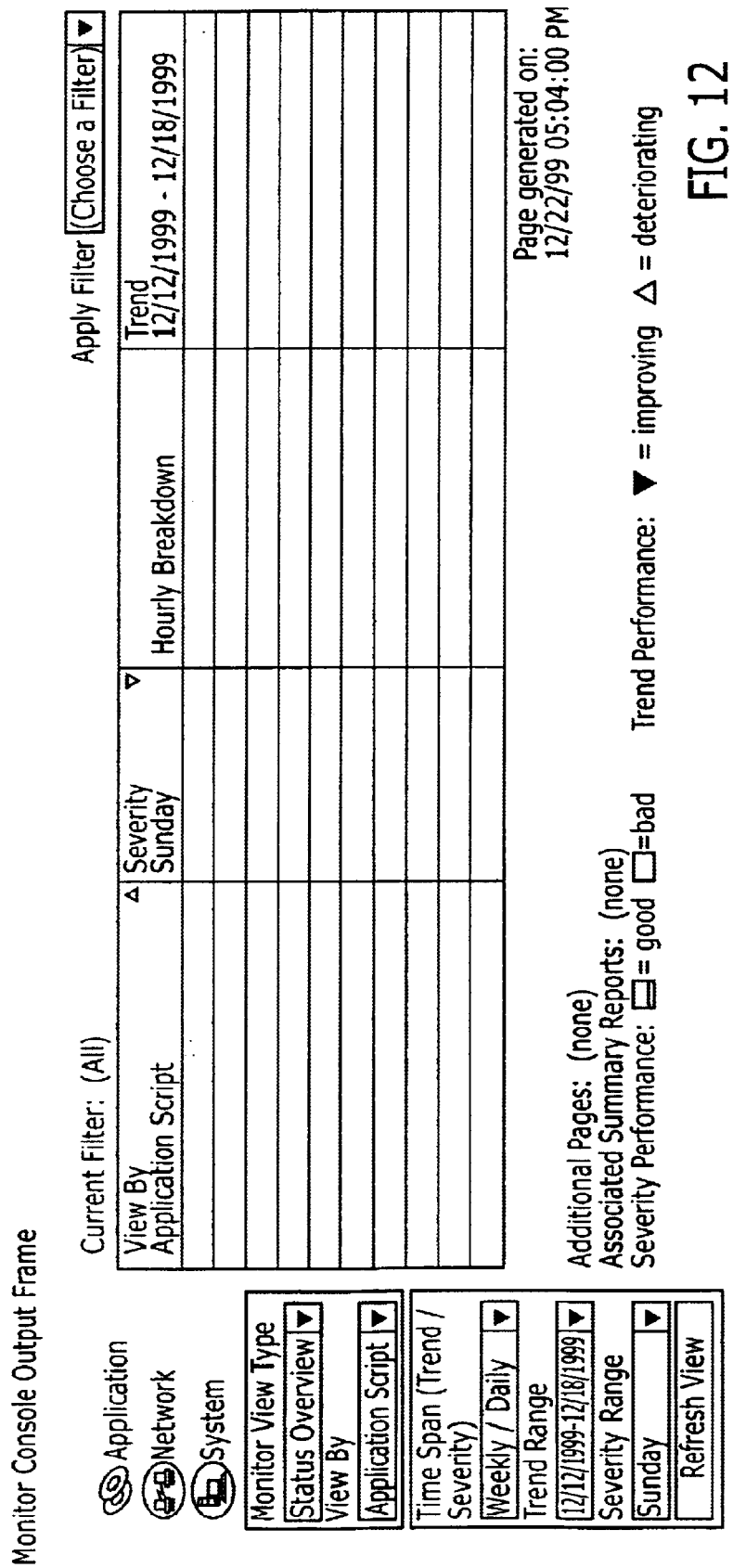
Figure 13:
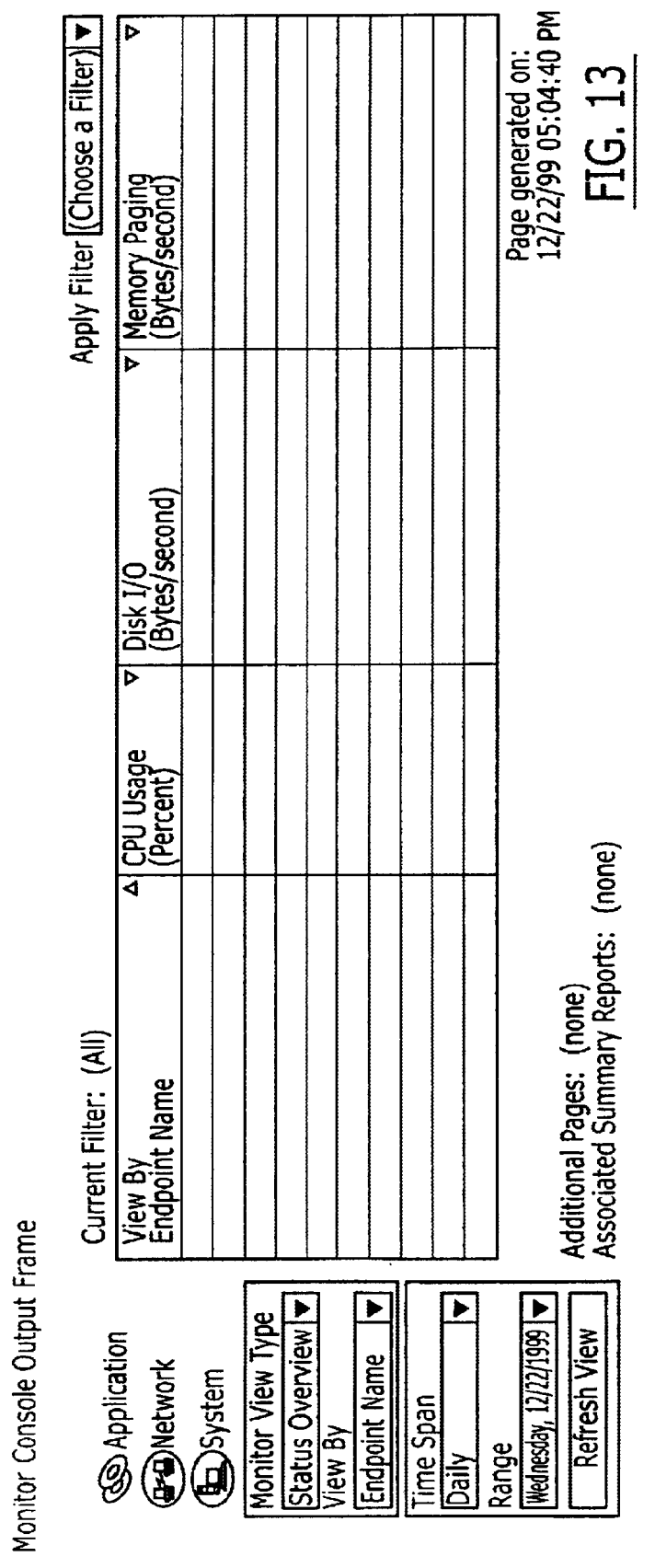

The present invention will now be further described with reference to the illustrative examples included in FIGS. 9A–9E, 10A–10E and 11A–11E. Referring now to FIG. 9A, an application monitor display is illustrated as indicated at the application monitor display icon 900. Selectable displays are also provided for a network (active) test 905 and for a system monitor 910 which are illustrated by the examples shown in FIG. 12 and FIG. 13 respectively. Also shown in the illustrated embodiment of FIG. 9A is a time period display/selection box 915 which indicates the time period which is used for establishing the original data set of network performance test results used for dynamic filtering according to the present invention.

In FIG. 9A, the table 920 shows results for all network performance test results during the respective time period broken down by application program. The first column 925 identifies the applications, the second column 930 provides the severity index, the third column 935 provides a graphical illustration of the severity index broken down by hour and the fourth column 940 provides a trend indication associated with the respective severity index information. A Lotus Notes identification 9B, the associated severity index icon 10A for Lotus Notes and the associated trend icon 11A for Lotus Notes are shown and identified by a notation referring to the corresponding figure which contains the information provided by user selection of each of these respective icons.

Figure 9B:
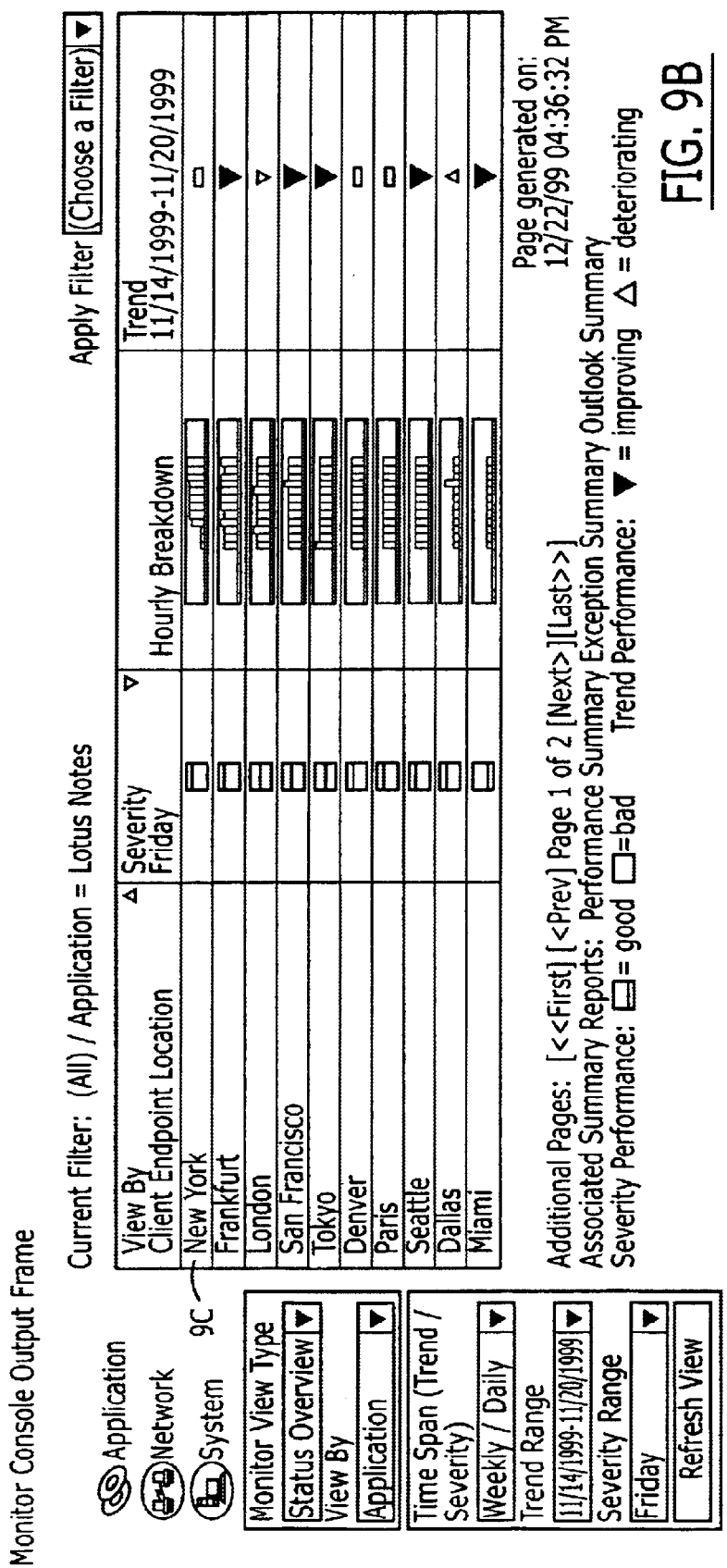
Figure 9E:
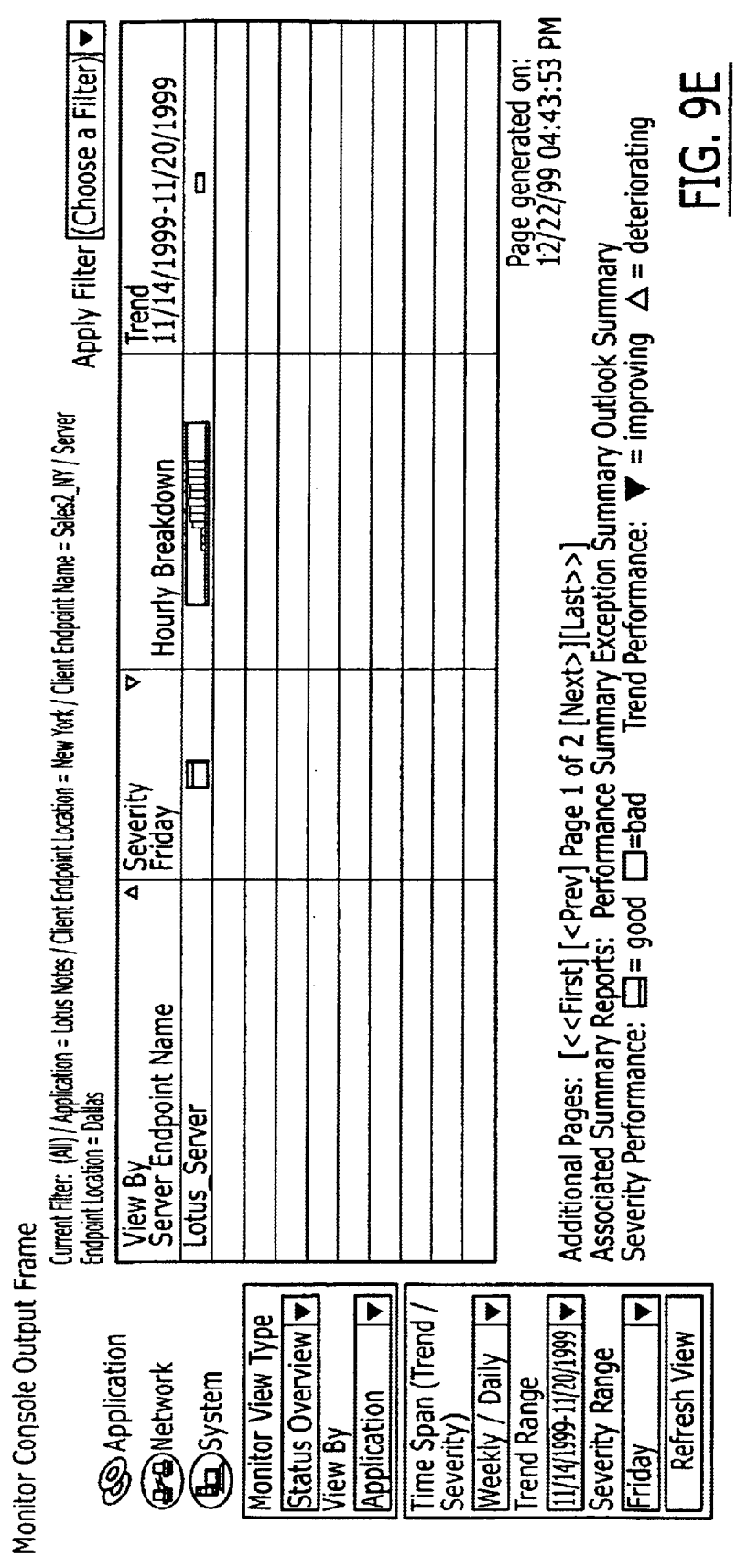

For example, selection of the Lotus Notes icon 9B filters all of the network performance test results which are associated with the Lotus Notes application and breaks them down and presents them by client endpoint location in FIG. 9B.

It is to be understood that each endpoint location may be associated with a plurality of client devices at the endpoint location. For example, selection of the New York icon 9C as illustrated in FIG. 9B provides the output illustrated in FIG. 9C, where additional filtering is provided selecting out only those network performance measurement test results associated with the Lotus Notes application and client endpoints in the endpoint location New York broken down by client endpoint name within the specified location. In the case of the example of FIG. 9C, two different client devices are broken out which are located at the client endpoint location New York. Selection of the Sales 2_NY icon 9D in FIG. 9C provides the output illustrated in FIG. 9D which shows that only a single server endpoint location, Dallas, is associated with the respective filtered data set. Finally, selection of the Dallas icon 9E of FIG. 9D provides the output display illustrated in FIG. 9E.

Referring again to FIG. 9A, selection of the severity index icon 10A for the Lotus Notes application provides the output illustrated in FIG. 10A. As seen in FIG. 10A, graphical information related to exception events for the severity index overall as well as breakouts by the various underlying performance measurement types, including response time and throughput, are also provided. Note that, in the example of FIG. 9A, no exception events are associated with throughput for the relevant time period and, therefore, no graphical display is provided.

Continuing with reference to FIG. 10A selection of the details icon 10B provides the display illustrated in FIG. 10B containing text data related to the information show graphically for the severity index profile in FIG. 10A. As seen in FIG. 10B, the severity index in the illustrated example is based on response time exceptions, throughput exceptions and availability exceptions. Referring again to FIG. 10A, selection of the application response time distribution status icon 10C provides a display output as illustrated in FIG. 10C in which the response time information is broken out to separately show client distribution time, network distribution time and server distribution time as well as the overall transaction distribution time.

If further detail is desired selection of the details icon 10D in FIG. 10C provides the tabular report output illustrated in the example of FIG. 10D. Similarly, selection of the summary icon 10E in FIG. 10C provides the summary tabular report output illustrated in FIG. 10E.

Referring again to FIG. 9A, a different sequence of filtered data presentations and formatting is provided by selection of the trend icon 11A associated with the Lotus Notes application which provides the output illustrated in FIG. 11A. As shown in FIG. 11A, graphical trend information is provided for response time, throughput and availability. Referring to FIG. 11A, additional detailed information related to the trend value for Lotus Notes for the relevant time period may be obtained by selecting the respective icons 11B through 11E which each provide the corresponding display output shown in the respective FIGS. 11B–11E. Accordingly, the use of exception event detection through autothresholding, severity indexes based on a plurality of different performance measurements to characterize network performance and dynamic filtering according to various aspects of the present invention may provide advantageous information to IT staffs to facilitate identification and correction of a wide range of network performance problems even in complex network environments.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed:

1. A method for dynamically filtering network performance test results comprising the steps of:

displaying a performance index for each of one of a plurality of applications that execute on a network or a first plurality of devices coupled to the network and an identification of each of the one of a plurality of applications that execute on the network or a first plurality of devices coupled to the network;

filtering the network performance test results based on a first user selection of one of the identifications to provide network performance test results associated with the selected one of the one of a plurality of applications that execute on the network or a first plurality of devices coupled to the network as first filtered results;

obtaining performance indexes for the other of a plurality of applications that execute on the network or a first plurality of devices coupled to the network based on the first filtered results responsive to the first user selection; and displaying the obtained performance indexes for the other of a plurality of applications that execute on the network or a first plurality of devices coupled to the network responsive to the first user selection.

2. A method according to claim 1 wherein the plurality of applications are application programs executing on the first plurality of devices and the network performance test results are based on passive monitoring of the application programs executing on the first plurality of devices.

3. A method according to claim 2 wherein the network performance test results are associated with a client-server communications network and wherein the first plurality of devices are client devices on the communications network.

4. A method according to claim 1 wherein the plurality of applications are application scripts and the network performance test results are based on active network testing of a communications network by the first plurality of devices using the application scripts.

5. A method according to claim 4 wherein the network performance test results are based on endpoint pair based active network testing using an endpoint specific test protocol between a designated first endpoint and an associated second endpoint and wherein the first plurality of devices are designated first endpoint devices.

6. A method according to claim 1 wherein the step of displaying the obtained performance indexes for the other of a plurality of applications or a first plurality of devices further comprises the step of displaying identifications of the other of a plurality of applications or a first plurality of devices and wherein the step of displaying the obtained performance indexes for the other of a plurality of applications or a first plurality of devices is followed by the steps of:

filtering the first filtered results based on a second user selection of one of the identifications of the other of a plurality of applications or a first plurality of devices to provide second filtered results;

obtaining performance indexes for a second plurality of devices coupled to the network based on the second filtered results responsive to the second user selection; and displaying the obtained performance indexes for the second plurality of devices coupled to the network responsive to the second user selection.

7. A method according to claim 6 wherein the network performance test results are associated with a client-server communications network and wherein the first plurality of devices are client devices on the communications network and wherein the second plurality of devices are server devices on the communications network.

8. A method according to claim 6 wherein the network performance test results are associated with a client-server communications network and wherein the first plurality of devices are server devices on the communications network and wherein the second plurality of devices are client devices on the communications network.

9. A method according to claim 1 wherein the step of obtaining performance indexes further comprises the step of generating a severity index for each of the other of a plurality of applications or a first plurality of devices characterizing network performance test results based on a number of exception events for each of a plurality of types of network performance tests and wherein the step of displaying the obtained performance indexes comprises the step of displaying the generated severity indexes.

10. A method according to claim 9 wherein the plurality of types of network performance tests include at least one of throughput, response time, application availability and transaction rate.

11. A method according to claim 9 wherein the step of generating a severity index further comprises the step of identifying exception events for each of the plurality of types of network performance tests using threshold criteria for each of the plurality of types of network performance tests which are based on a specified percentage of baseline results for the respective types of network performance tests.

12. A method according to claim 11 wherein the step of identifying exception events further comprises the step obtaining the specified percentages from a user to provide threshold criteria having a user selected sensitivity.

13. A method according to claim 11 wherein the step of identifying exception events further comprises the following steps performed for each of the plurality of types of network performance tests:

designating a number of data buckets for the respective type of network performance test and an associated range for each of the data buckets, at least one of the number of data buckets or the associated range for each of the data buckets being selected based on a desired range for the specified percentages, the data buckets comprising the baseline results;

generating a network performance test data record based on a transaction that is performed over the network;

incrementing one of the designated data buckets having an associated range including the generated network performance test data record to record the network performance test data record;

determining ones of the data buckets satisfying the specified percentage for the respective type of network performance test based on numbers of records recorded in the data buckets; and identifying an exception event if the generated network performance test data record corresponds to a data bucket not satisfying the specified percentage.

14. A method according to claim 13 wherein the specified percentage falls within the range of one of the data buckets and wherein the step of determining ones of the data buckets satisfying the specified percentage further comprises the step of designating a first portion of the one of the data buckets as satisfying the specified percentage and a second portion of the one of the data buckets as not satisfying the specified percentage based on the specified percentage and treating the data records within the one of the data buckets as being uniformly distributed.

15. A method according to claim 9 further comprising the steps of:
   obtaining information related to the number of exception events for each of a plurality of types of network performance tests associated with a displayed one of the generated severity indexes responsive to a user selection of the displayed one of the generated severity indexes; and
   displaying the obtained information responsive to the user selection of the displayed one of the generated severity indexes.

16. A method according to claim 1 further comprising the steps of:
   displaying a trend associated with the performance index for each of one of a plurality of applications or a first plurality of devices;
   obtaining trends associated with each of the obtained performance indexes for the other of a plurality of applications or a first plurality of devices responsive to the first user selection; and
   displaying the obtained trends associated with each of the obtained performance indexes responsive to the first user selection.

17. A method according to claim 16 wherein the steps of displaying a performance index for each of one of a plurality of applications or a first plurality of devices and displaying a trend associated with the performance index for each of the one of a plurality of applications or a first plurality of devices are executed concurrently and wherein the steps of displaying the obtained performance indexes and displaying the obtained trends are executed concurrently and wherein the trends are displayed associated with their respective performance indexes.

18. A method according to claim 17 further comprising the steps of:
   obtaining information related to performance trends for each of a plurality of types of network performance tests associated with a displayed one of the obtained trends responsive to a user selection of the displayed one of the obtained trends; and
   displaying the obtained information responsive to the user selection of the displayed one of the obtained trends.

19. A method for identifying a network performance problem based on network performance test results comprising the steps of:
   generating a performance index for each of one of a plurality of applications that execute on the network or a plurality of first devices coupled to the network and an identification of each of the one of a plurality of applications that execute on the network or a plurality of first devices coupled to the network based on the network performance test results;
   selecting one of the one of a plurality of applications that execute on the network or a plurality of first devices coupled to the network associated with a worst one of the generated performance indexes to provide a first selection;
   filtering the network performance test results based on the first selection to provide network performance test results associated with the selected one of the one of a plurality of applications that execute on the network or a first plurality of devices coupled to the network as first filtered results;
   obtaining performance indexes for the other of a plurality of applications that execute on the network or a first plurality of devices coupled to the network based on the first filtered results responsive to the first selection;
   selecting one of the obtained performance indexes associated with a worst one of the obtained performance indexes to provide a second selection;
   obtaining information related to a number of exception events for each of a plurality of types of network performance tests, the exception events being associated with the selected one of the obtained performance indexes, responsive to the second selection;
   selecting one of the plurality of types of network performance tests associated with a worst one of the number of exception events to provide a third selection; and
   obtaining information related to the worst one of the number of exception events responsive to the third selection.

20. A method for recording network Performance measurements for a communications network comprising the steps of:
   designating a number of data buckets for the network performance measurements and an associated range for each of the data buckets, at least one of the number of data buckets or the associated range for each of the data buckets being selected based on a user interest criterion;
   obtaining one of the network performance measurements based on a communication transaction over the communications network;
   incrementing one of the designated data buckets having an associated range including the obtained one of the network performance measurements to record the generated one of the network performance measurements; and
   wherein designating a number of data buckets comprises:
   determining a maximum and a minimum expected value for the network performance measurements;
   determining a desired granularity for the network performance measurements; and
   determining the number of data buckets based on the maximum and minimum expected values and the desired granularity.

21. A method according to claim 20 wherein the step of designating a number of data buckets further comprises the steps of:
   identifying a first range of values between the maximum and the minimum expected value as a preferred range; and
   associating a portion of the data buckets to the preferred range which exceeds a ratio of the preferred range to a difference between the maximum and the minimum expected value to provide an increased granularity in the preferred range.

22. A method according to claim 21 wherein the step of identifying a first range further comprises the step of identifying the first range to cover an expected range of performance threshold criteria for the network performance measurements.

23. A method for characterizing performance of a communications network comprising the step of generating a severity index associated with at least one of an application executing on the network or a device coupled to the network based on a number of exception events for each of a plurality of types of network performance tests, wherein the step of generating a severity index comprises the step of generating the severity index based on a function of a ratio of the severity points to a total transaction count over which the severity points were obtained.

24. A method according to claim 23 wherein the plurality of types of network performance tests include at least one of throughput, response time, application availability and transaction rate.

25. A method according to claim 24 wherein the step of generating a severity index further comprises the step of providing each of the plurality of types of network performance tests a selected weighting in the severity index.

26. A method according to claim 25 wherein the step of generating a severity index further comprises the step of pre-scaling each of the exception events based on a degree of deviation of the exception event wherein an exception based on a larger degree of deviation is provided a greater magnitude of severity points.

27. A method according to claim 26 wherein the step of generating a severity index comprises the step of generating the severity index based on a logarithmic function of the ratio of the severity points to the total transaction count over which the severity points were obtained.

28. A system for dynamically filtering network performance test results comprising:
a display that displays a performance index for each of one of a plurality of applications that execute on a network or a first plurality of devices coupled to the network and an identification of each of the one of a plurality of applications that execute on the network or a first plurality of devices coupled to the network;
a filter module that filters the network performance test results based on a first user selection of one of the identifications to provide network performance test results associated with the selected one of the one of a plurality of applications that execute on the network or a first plurality of devices coupled to the network as first filtered results;
a performance index generation module that obtains performance indexes for the other of a plurality of applications that execute on the network or a first plurality of devices coupled to the network based on the first filtered results responsive to the first user selection; and
wherein the display is configured to display the obtained performance indexes for the other of a plurality of applications that execute on the network or a first plurality of devices coupled to the network responsive to the first user selection.

29. A system for dynamically filtering network performance test results comprising:
means for displaying a performance index for each of one of a plurality of applications that execute on a network or a first plurality of devices coupled to the network and an identification of each of the one of a plurality of applications that execute on the network or a first plurality of devices coupled to the network;
means for filtering the network performance test results based on a first user selection of one of the identifications to provide network performance test results associated with the selected one of the one of a plurality of applications that execute on the network or a first plurality of devices coupled to the network as first filtered results;

means for obtaining performance indexes for the other of a plurality of applications that execute on the network or a first plurality of devices coupled to the network based on the first filtered results responsive to the first user selection; and
means for displaying the obtained performance indexes for the other of a plurality of applications that execute on the network or a first plurality of devices coupled to the network responsive to the first user selection.

30. A system for recording network performance measurements for a communications network comprising:
means for designating a number of data buckets for the network performance measurements and an associated range for each of the data buckets, at least one of the number of data buckets or the associated range for each of the data buckets being selected based on a user interest criterion;
means for obtaining one of the network performance measurements based on a communication transaction over the communications network;
means for incrementing one of the designated data buckets having an associated range including the obtained one of the network performance measurements to record the generated one of the network performance measurements; and
wherein the means for designating a number of data buckets comprises:
means for determining a maximum and a minimum expected value for the network performance measurements;
means for determining a desired granularity for the network performance measurements; and
means for determining the number of data buckets based on the maximum and minimum expected values and the desired granularity.

31. A system for characterizing performance of a communications network comprising:
means for detecting exception events for a plurality of types of network performance tests; and
means for generating a severity index associated with at least one of an application executing on the network or a device coupled to the network based on a number of exception events for each of a plurality of types of network performance tests, wherein the step of generating a severity index comprises the step of generating severity index based on a function of a ratio of the severity points to a total transaction count over which the severity points were obtained.

32. A computer program product for dynamically filtering network performance test results, the computer program product comprising:
a computer readable storage medium having computer readable program code embodied in said medium, said computer-readable program code comprising:
computer-readable program code that displays a performance index for each of one of a plurality of applications that execute on a network or a first plurality of devices coupled to the network and an identification of each of the one of a plurality of applications that execute on the network or a first plurality of devices coupled to the network;
computer-readable program code that filters the network performance test results based on a first user selection of one of the identifications to provide network performance test results associated with the selected one of the one of a plurality of applications or a first plurality of devices as first filtered results;

computer-readable program code that obtains performance indexes for the other of a plurality of applications or a first plurality of devices based on the first filtered results responsive to the first user selection; and computer-readable program code that displays the obtained performance indexes for the other of a plurality of applications or a first plurality of devices responsive to the first user selection.

33. A computer program product for recording network performance measurements for a communications network, the computer program product comprising:

a computer-readable storage medium having computer readable program code embodied in said medium, said computer-readable program code comprising:

computer-readable program code that designates a number of data buckets for the network performance measurements and an associated range for each of the data buckets, at least one of the number of data buckets or the associated range for each of the data buckets being selected based on a user interest criterion;

computer-readable program code that obtains one of the network performance measurements based on a communication transaction over the communications network;

computer-readable program code that increments one of the designated data buckets having an associated range including the obtained one of the network performance measurements to record the generated one of the network performance measurements; and wherein the computer-readable program code that designates a number of data buckets comprises:

computer-readable program code that determines a maximum and a minimum expected value for the network performance measurements;

computer-readable program code that determines a desired granularity for the network performance measurements; and computer-readable program code that determines the number of data buckets based on the maximum and minimum expected values and the desired granularity.

34. A computer program product for characterizing performance of a communications network, the computer program product comprising:

a computer-readable storage medium having computer readable program code embodied in said medium, said computer-readable program code comprising:

computer-readable program code that detects exception events related to a communication transaction on a communications network for a plurality of types of network performance tests; and computer-readable program code that generates a severity index associated with at least one of an application executing on the network or a device connected to the network based on a number of exception events for each of a plurality of types of network performance tests, wherein the step of generating a severity index comprises the step of generating severity index based on a function of a ratio of the severity points to a total transaction count over which the severity points were obtained.

* * * * *